US009091754B2

(12) United States Patent
d'Aligny

(10) Patent No.: US 9,091,754 B2
(45) Date of Patent: Jul. 28, 2015

(54) DISTANCE MEASUREMENT METHODS AND APPARATUS

(75) Inventor: Auguste d'Aligny, Paris (FR)

(73) Assignee: Trimble A.B., Danderyd (SE)

(*) Notice: Subject to any disclaimer, the term of this patent is extended or adjusted under 35 U.S.C. 154(b) by 0 days.

(21) Appl. No.: 13/594,783

(22) Filed: Aug. 25, 2012

(65) Prior Publication Data
US 2013/0050676 A1 Feb. 28, 2013

Related U.S. Application Data

(60) Provisional application No. 61/529,807, filed on Aug. 31, 2011.

(51) Int. Cl.
G01C 3/08 (2006.01)
G01S 17/10 (2006.01)
G01S 7/484 (2006.01)
G01S 7/487 (2006.01)
G01S 7/481 (2006.01)

(52) U.S. Cl.
CPC .............. *G01S 17/10* (2013.01); *G01S 7/484* (2013.01); *G01S 7/487* (2013.01); *G01S 7/4815* (2013.01)

(58) Field of Classification Search
CPC ......... G01S 17/10; G01S 7/497; G01S 17/89; G01S 7/487; G01C 3/08
USPC ........... 356/4.01, 5.01, 5.09, 3.01, 3.09, 4.07, 356/9, 625
See application file for complete search history.

(56) References Cited

U.S. PATENT DOCUMENTS

| 6,111,241 | A | * | 8/2000 | English et al. | 250/203.2 |
| 7,046,349 | B2 | * | 5/2006 | Everall et al. | 356/73.1 |
| 7,608,771 | B2 | * | 10/2009 | Fournier et al. | 84/422.1 |
| 7,944,548 | B2 | * | 5/2011 | Eaton | 356/5.01 |
| 8,410,743 | B2 | * | 4/2013 | Watahiki | 318/779 |

(Continued)

FOREIGN PATENT DOCUMENTS

| EP | 1 012 627 B1 | 10/2002 |
| EP | 1 832 897 A1 | 9/2007 |

(Continued)

OTHER PUBLICATIONS

International Search Report dated Jan. 29, 2013 in International Application No. PCT/IB2012/001654.

(Continued)

*Primary Examiner* — Isam Alsomiri
*Assistant Examiner* — Samantha K Abraham
(74) *Attorney, Agent, or Firm* — Kilpatrick Townsend & Stockton LLP

(57) ABSTRACT

Distance measurement methods and apparatus use laser pulse sets having signatures which enable returned pulses to be correlated with emitted pulses. Each pulse set comprises at least one pulse and a signature selected from a set of possible signatures. Pulse sets reflected from at least one surface are detected and, for each set, the signature is recognized and a time of flight is determined. Signatures are defined by one or more of: spacing in time between pulses of a set, wavelength of the at least one pulse of the set, spacing in time between a first subset of a set and a second subset of a set, difference of wavelength between pulses of a set, and difference of wavelength between a first subset of a set and a second subset of a set. Each set can have multiple groups of pulses and pulses within a group can have different amplitudes.

28 Claims, 21 Drawing Sheets

(56) References Cited

U.S. PATENT DOCUMENTS

| | | | |
|---|---|---|---|
| 2001/0020850 A1* | 9/2001 | McIntosh et al. | 324/519 |
| 2006/0088081 A1* | 4/2006 | Withington et al. | 375/130 |
| 2008/0192228 A1 | 8/2008 | Eaton | |
| 2009/0102703 A1* | 4/2009 | Mohamadi et al. | 342/204 |
| 2009/0127438 A1* | 5/2009 | Barbier et al. | 250/208.1 |
| 2010/0030299 A1* | 2/2010 | Covalin | 607/46 |
| 2010/0066995 A1 | 3/2010 | Rindle | |
| 2010/0128246 A1 | 5/2010 | Heizmann et al. | |
| 2010/0195088 A1 | 8/2010 | d'Aligny et al. | |
| 2011/0187579 A1* | 8/2011 | Asada et al. | 342/27 |
| 2011/0317256 A1* | 12/2011 | Hou et al. | 359/337.21 |
| 2012/0257186 A1 | 10/2012 | Rieger et al. | |

FOREIGN PATENT DOCUMENTS

| | | |
|---|---|---|
| EP | 1832897 A1 | 12/2007 |
| WO | 99/13356 A2 | 3/1999 |
| WO | 2007/110141 A1 | 10/2007 |
| WO | 2008/107129 A1 | 9/2008 |
| WO | 2009/039875 A1 | 4/2009 |

OTHER PUBLICATIONS

Written Opinion of the International Searching Authority dated Jan. 29, 2013 in International Application No. PCT/IB2012/001654.

International Search Report mailed Jan. 29, 2013 in International Application No. PCT/IB2012/001654 (5 pages).

Written Opinion of the International Searching Authority mailed Jan. 29, 2013 in International Application No. PCT/IB2012/001654 (12 pages).

* cited by examiner

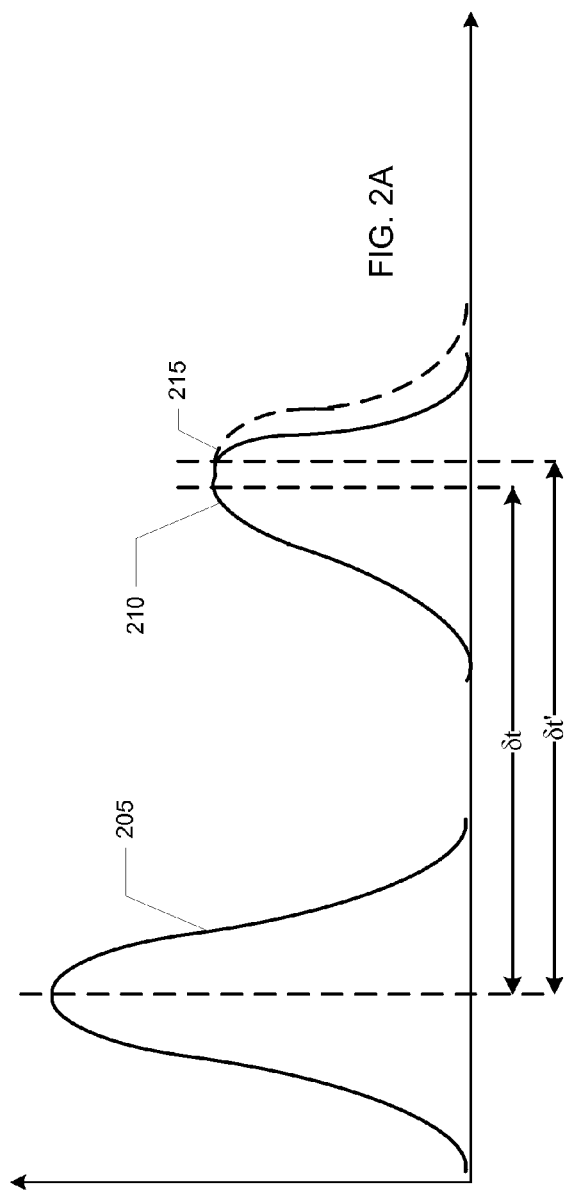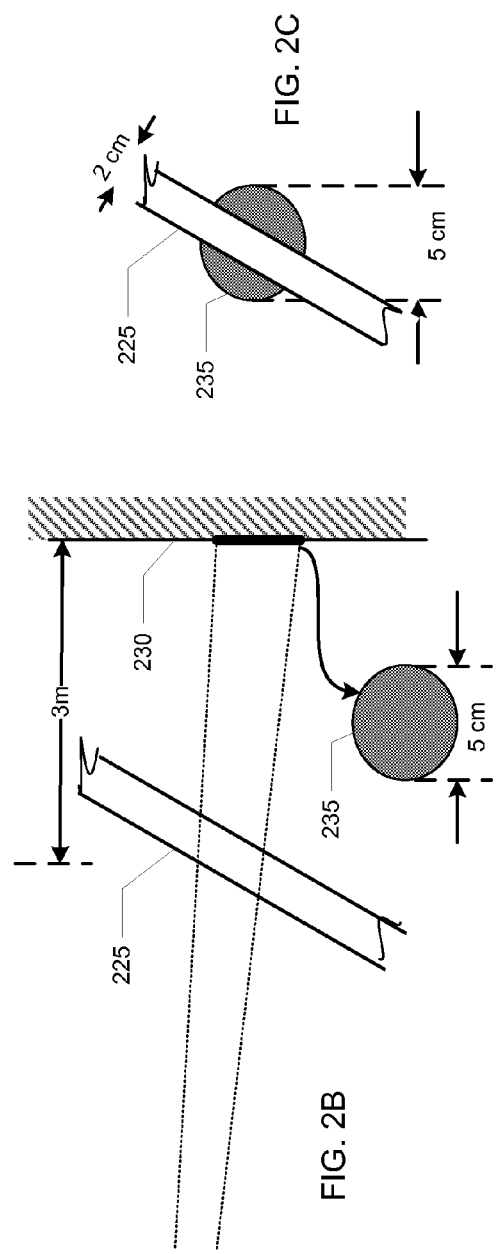

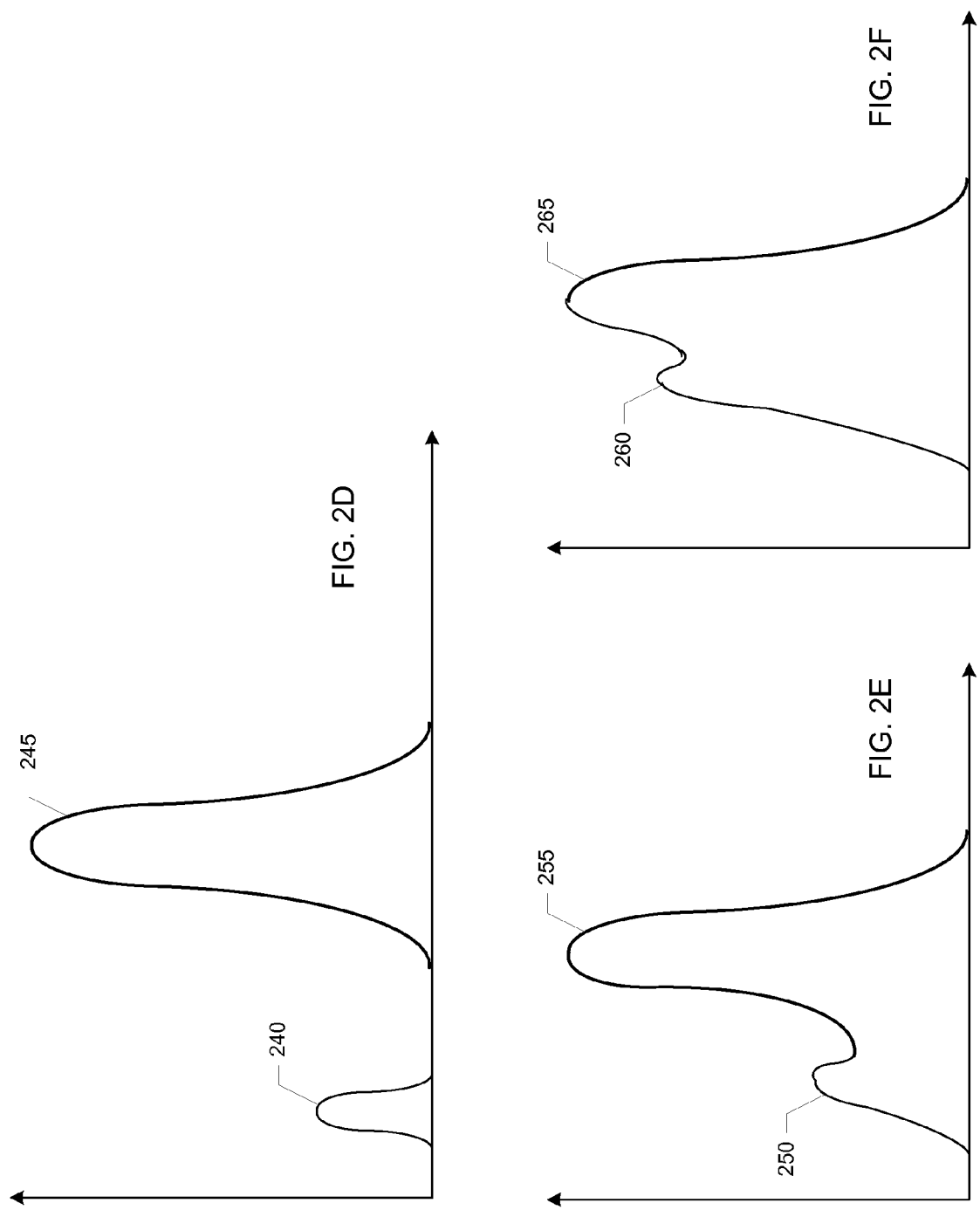

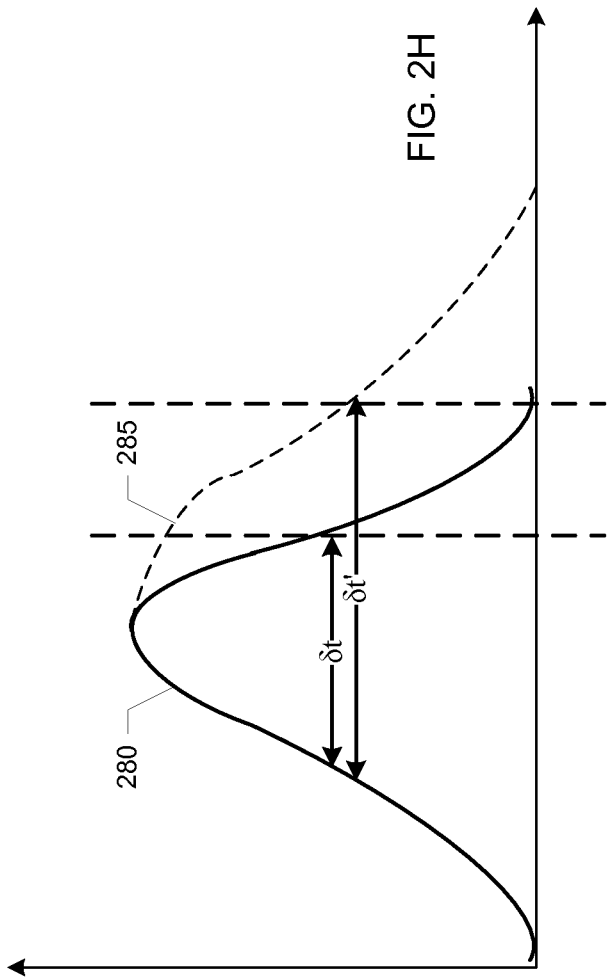
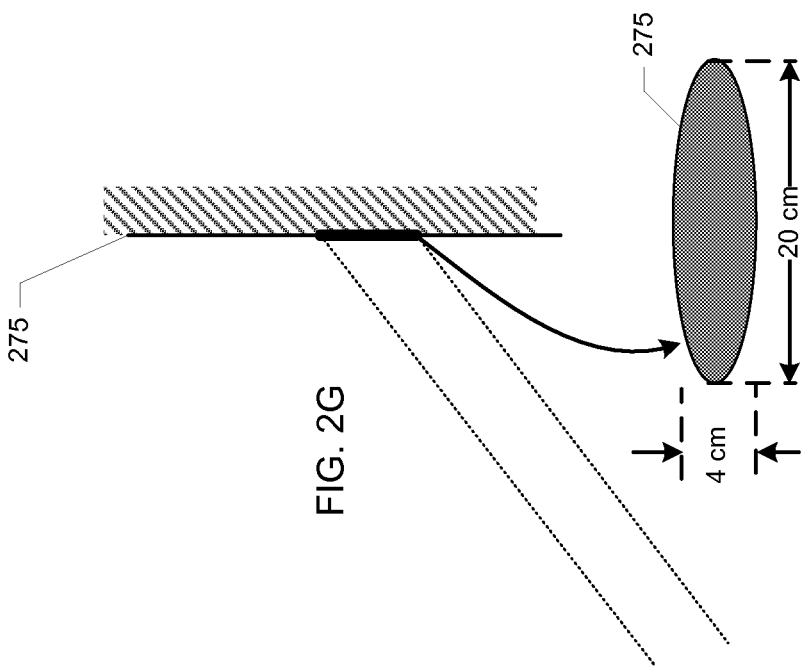

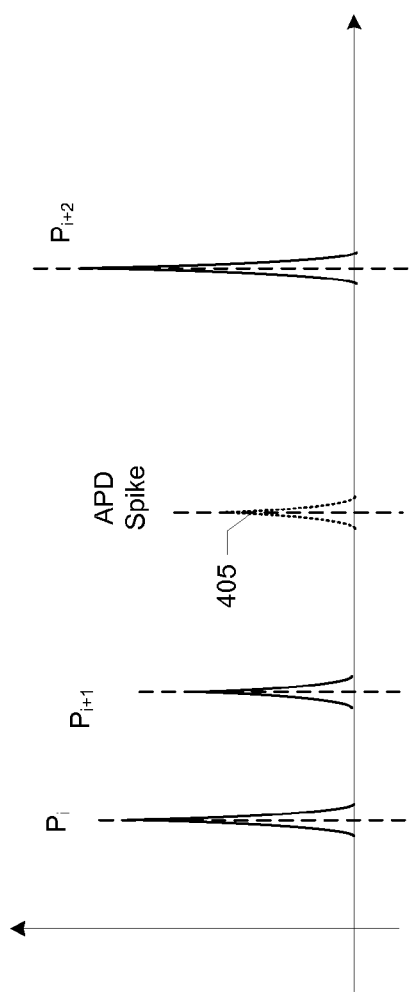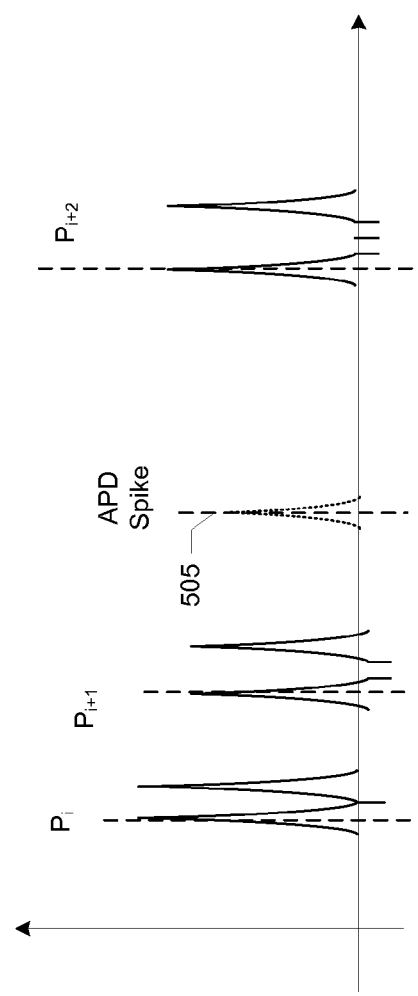

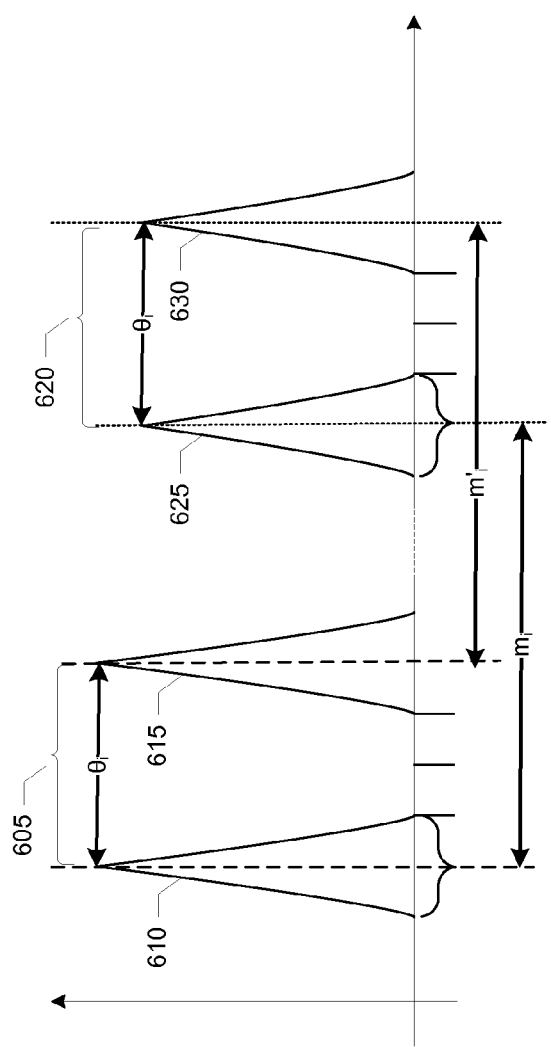
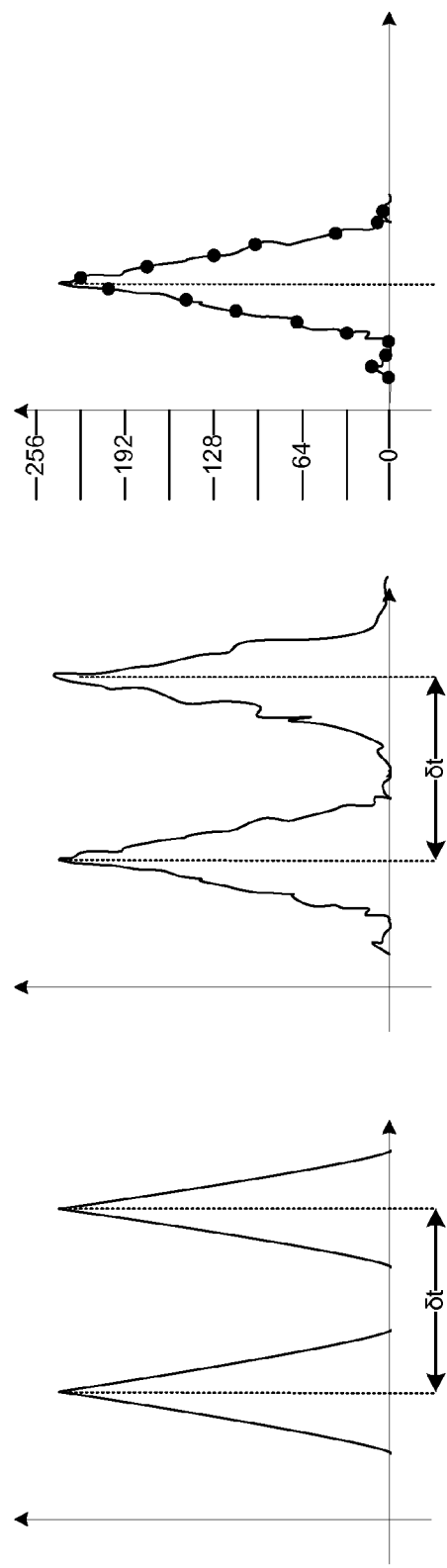
FIG. 6A
FIG. 6B
FIG. 6C
FIG. 6D

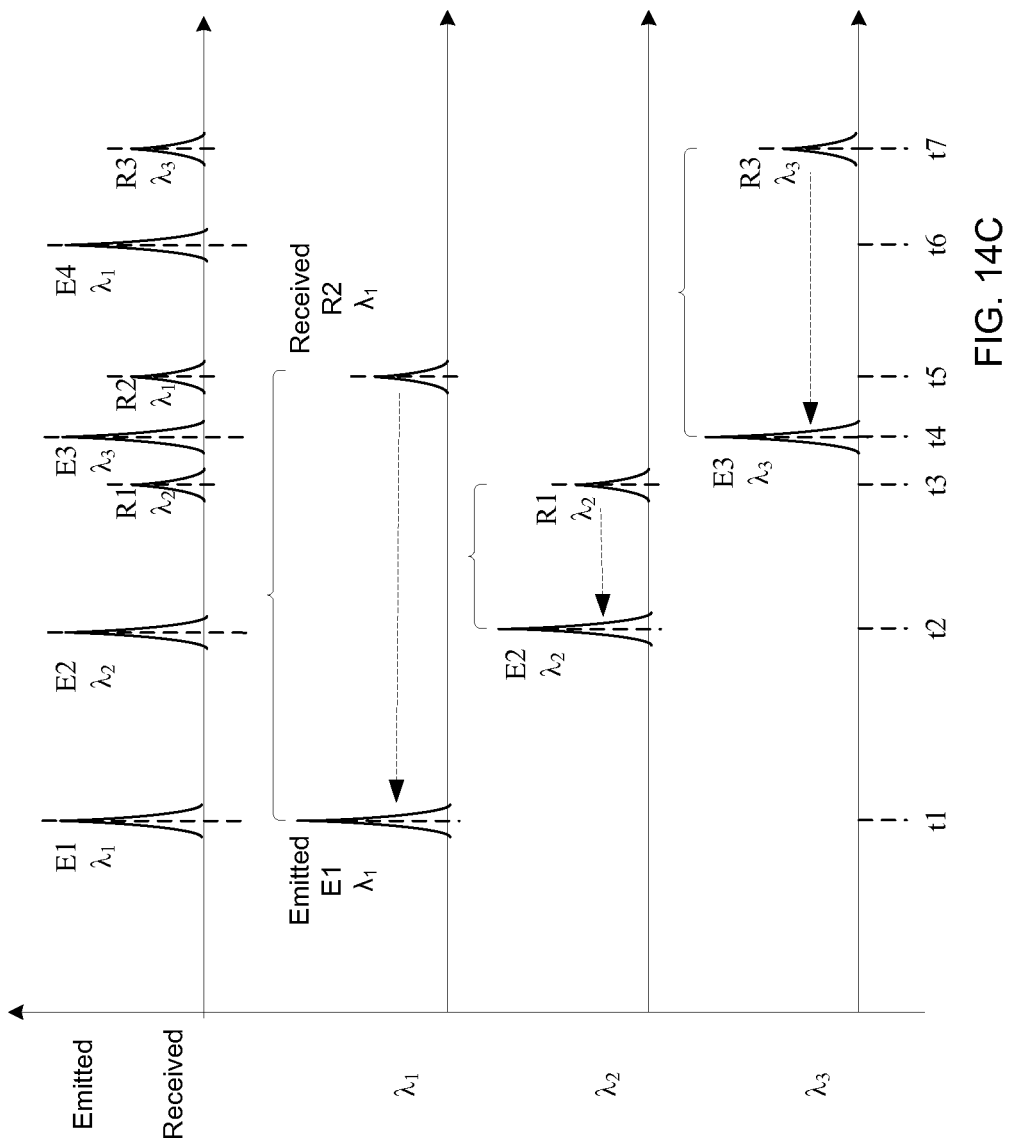

DISTANCE MEASUREMENT METHODS AND APPARATUS

CROSS REFERENCE TO RELATED APPLICATIONS

The following are related hereto and incorporated herein in their entirety by this reference: U.S. Provisional Application for Patent No. 61/529,807, filed 31 Aug. 2011; International Patent Application PCT/EP2007/008487 filed 28 Sep. 2007, International Publication Number WO 2009/039875 A1 dated 2 Apr. 2009; U.S. patent application Ser. No. 12/731,048 filed 24 Mar. 2010, Patent Application Publication US 2010/0195088 A1 dated 5 Aug. 2010.

International Patent Application PCT/EP2008/001628 filed 29 Sep. 2007, International Publication Number WO 2008/107129 A1 dated 12 Sep. 2008; German Patent Application DE 10 2007 010 236.6 filed 2 Mar. 2007; U.S. patent application Ser. No. 12/449,290 filed 2 Sep. 2009, Patent Application Publication US 2010/0066995 A1 dated 18 Mar. 2010.

TECHNICAL FIELD

The present invention relates to the field of electronic distance measurement. More particularly, the present invention relates to methods and apparatus for electronic distance measurement using laser pulse sets having signatures.

BACKGROUND ART

In time-of-flight distance measurement, the time delay between emission and reception of a laser pulse allows for distance calculation. However, when the pulse emission frequency is high and when distances are long, a new pulse could be emitted before the previous pulse has returned to the detector. In this situation it is only possible to make the time of flight measurement if the returned pulse can be correctly matched to an emitted pulse.

FIG. 1 illustrates an example in which there is ambiguity as to which emitted pulse corresponds to which returned pulse.

In this example, a train of laser pulses is emitted at intervals of $T_a \sim 1$ µsec, e.g., pulses $P_i$, $P_{i+1}$, $P_{i+2}$, $P_{i+3}$, $P_{i+4}$, $P_{i+5}$, $P_{i+6}$. Returned pulse $P_i$ is received at time $\delta t_i$, returned pulse $P_{i+1}$ is received at time $\delta t_{i+1}$, returned pulse $P_{i+2}$ is received at time $\delta t_{i+2}$, returned pulse $P_{i+3}$ is received at time $\delta t_{i+3}$, returned pulse $P_{i+4}$ is received at time $\delta t_{i+4}$, and returned pulse $P_{i+5}$ is received at time $\delta t_{i+5}$.

If no pulse has been emitted before $P_i$, there is no ambiguity as to returned pulse $P_i$ as it is detected prior to emission of pulse $P_{i+1}$. In the case of pulse $P_i$ the distance $d_i$ to the target is determined from the one-way time of flight $\delta t/2$ of the laser pulse and the speed of light c.

However, returned pulse $P_{i+1}$ presents an ambiguity as it is detected after emission of pulse $P_{i+2}$ so that it is unknown whether it corresponds to emitted pulse $P_{i+1}$ or emitted pulse $P_{i+2}$. Similarly, returned pulses $P_{i+3}$ and $P_{i+4}$ are detected after emission of emitted pulses $P_{i+2}$, $P_{i+3}$ and $P_{i+4}$ so that it is ambiguous as to which returned pulse corresponds to which emitted pulse. Returned pulses $P_{i+2}$ and $P_{i+5}$ are detected after emission of pulses $P_{i+5}$ and $P_{i+6}$ and very close in time to one another. Correctly determining time of flight is not possible in these situations.

It can be seen that this problem severely limits the rate at which pulses can be emitted and the range of time-of-flight measurements which can be accommodated. The practical consequence in a device used for point scanning is to limit the scanning rate and the scanning range of the device.

Another problem which arises when scanning in real-world environments is that of variable reflectivity. A non-cooperative or low-cooperative surface may have an albedo of, for example, around 1%. A stainless-steel pipe as in industrial piping or a chromed surface may reflect light at an angle like a mirror such that nearly all or nearly none of the pulse is detected at the scanner. A glass surface may have a very high dynamic range of reflectivity, depending on whether the glass is clean or dirty; if the glass is clean the reflectivity may be very low but if dirty the returned pulse may be easily detected. White paper is a highly cooperative surface with a typical albedo of 90-95%. A surface which is partly black and partly white can result in a deformed returned pulse.

A surface with an albedo of 1% at a range of 100 m is equivalent to an albedo of 100% at 1 km. A cooperative surface allows measurement of distant targets with correspondingly long time-of-flight of the laser pulse. To be paired without any ambiguity to the emitted pulse, a reflected pulse must be detected before the next pulse to be emitted, i.e., the scanning range must be less than the distance corresponding to the time of flight of the emitted pulse period. In this respect a distance of 150 m corresponds to a time of flight on the order of about one µsec. When the scanning speed is small, the distance of ambiguity is large, and as the light returned by a target decreases as the inverse of the square of the distance there may be no returned pulse detected after a delay less than the period of the emitted pulses, and thus no pairing problem arises.

In systems where the range of distances measured is relatively limited, it is possible to emit several laser pulses and open a detection window during an approximate expected arrival time of each returned pulse. This can be done for example where scanning is performed from an aircraft flying at a known height above ground level where the surfaces being scanned are within a limited range. See, for example, U.S. Patent Publication 2008/0192228. The use of detection windows is not workable where the approximate time of arrival of returned pulses cannot be predicted, as in the example of FIG. 1.

Distance measurement using a continuous laser and detecting phase shift of the reflected light has the advantage of high scanning speed, but has the disadvantage that each surface sends its own phase so that detection is a linear combination of the two phases. In a dense industrial environment having for example many pipes, a small pipe can intercept a part of the laser and make the distance to the pipe difficult to distinguish from distance to a surface behind the pipe.

Another issue in scanner design is that of eye safety, which limits the average power of the laser pulses emitted.

An ideal scanner would be capable of very fast scanning over a very wide range of distances, allowing use of a single scanner to measure points indoors as well as outdoors, near and far points relative to the scanner position, and within the laser power constraints required for eye safety. Currently, a user needs one scanner for indoor use and another scanner for outdoor use.

To summarize, issues encountered in scanner design include scanning speed, scanning distance, target albedo, and human eye safety.

Improved methods and apparatus for precise laser distance measurement are desired.

SUMMARY

Some embodiments of the invention provide for distance measurement using laser pulse sets having signatures which enable the returned pulses to be correlated with the emitted pulses.

Some embodiments provide a method of measuring distance comprising: emitting a series of laser pulse sets, each laser pulse set comprising at least one pulse and having a signature selected from a set of possible signatures, detecting the laser pulse sets as reflected from at least one surface, recognizing the signature of each detected laser pulse set, and determining a time of flight for each of the detected laser pulse sets.

In some embodiments the signature is determined by spacing in time between pulses of a pulse set. In some embodiments, the signature of a pulse set is defined by wavelength of the at least one pulse of the pulse set. In some embodiments, the signature is determined by spacing in time between a first subset of a pulse set and a second subset of a pulse set. In some embodiments, each spacing defines a unique signature. In some embodiments, the signature is determined by difference of wavelength between pulses of a pulse set. In some embodiments, the signature is determined by difference of wavelength between a first subset of a pulse set and a second subset of a pulse set. In some embodiments, a unique signature is defined by one of: a wavelength of a pulse set, and a wavelength difference between a first subset of a pulse set and a second subset of a pulse set.

In some embodiments, each laser pulse set emitted has multiple groups of pulses and the pulses within a group have different amplitudes. In some embodiments, within a group a first pulse has a first amplitude and at least one subsequent pulse has an amplitude higher than the first amplitude.

In some embodiments, emitting a laser pulse set comprises emitting multiple pulses of substantially the same amplitude and wherein detecting a laser pulse set comprises averaging the measured detected times of multiple pulses of the laser pulse set. In some embodiments, emitting a laser pulse set comprises emitting multiple groups of pulses having different pulse amplitudes within each group, and wherein detecting a laser pulse set comprises averaging the measured detected times of multiple groups of pulses of the laser pulse set.

In some embodiments, recognizing the signature of each detected laser pulse set comprises: determining respective detection times of pulses of the laser pulse set, determining a time difference between the detection times, and correlating the time difference with a signature of an emitted pulse set.

In some embodiments, recognizing the signature of each detected laser pulse set comprises: determining respective wavelengths of pulses of the laser pulse set, and correlating the determined wavelengths with a signature of an emitted pulse set.

In some embodiments, emitting a series of laser pulse sets comprises, for each emitted pulse set, determining a start time and associating the start time with the selected signature of the emitted pulse set; recognizing the signature comprises, for each detected pulse set, determining a signature of the detected pulse set; and determining a time of flight comprises, for each detected laser pulse set, determining a stop time for the detected pulse set, and associating the stop time with a start time which is associated with a signature corresponding to the signature of the detected pulse set.

In some embodiments, for each detected laser pulse set the stop time and the associated start time comprise a couple from for use in determining a time of flight.

In some embodiments, multiple laser pulse sets are emitted prior to detecting a laser pulse set, and each detected laser pulse set is uniquely identified by signature with an emitted laser pulse set.

In some embodiments, a method comprises, for each signature: storing in association with the signature a start time of each emitted laser pulse set having the signature, correlating a stop time of each detected laser pulse set recognized as having the signature with a start time stored in association with the signature, storing the stop time in association with the correlated start time to form a start-stop couple for the signature, and retrieving the stored start-stop couple in the order in which it was stored.

In some embodiments, a method comprises, for each signature, voiding a stop time stored in association with the signature after retrieving the stored start-stop couple and before storing a subsequent start time of an emitted laser pulse set having the signature.

Some embodiments provide apparatus for measuring distance comprising: a laser source adapted to emit a series of laser pulse sets, each laser pulse set comprising at least one pulse and having a signature selected from a set of possible signatures, a detector adapted to detect the laser pulse sets as reflected from at least one surface, a discriminator to recognize the signature of each detected laser pulse set, and a time-of-flight computer to determine a time of flight for each of the detected laser pulse sets.

In some embodiments, the signature is determined by spacing in time between pulses of a pulse set. In some embodiments, the signature of a pulse set is defined by wavelength of the at least one pulse of the pulse set. In some embodiments, the signature is determined by spacing in time between a first subset of a pulse set and a second subset of a pulse set. In some embodiments, each spacing defines a unique signature. In some embodiments, the signature is determined by difference of wavelength between pulses of a pulse set. In some embodiments, the signature is determined by difference of wavelength between a first subset of a pulse set and a second subset of a pulse set. In some embodiments, a unique signature is defined by one of: a wavelength of a pulse set, and a wavelength difference between a first subset of a pulse set and a second subset of a pulse set.

In some embodiments, each laser pulse set emitted has multiple groups of pulses and the pulses within a group have different amplitudes. In some embodiments, within a group a first pulse has a first amplitude and at least one subsequent pulse has an amplitude higher than the first amplitude.

In some embodiments, the laser source is adapted to emit a laser pulse set having multiple pulses of substantially the same amplitude and wherein the detector is adapted to determine an average amplitude over multiple pulses of each detected laser pulse set. In some embodiments, the laser source is adapted to emit a laser pulse set comprising multiple groups of pulses having different pulse amplitudes within each group, and wherein the detector is adapted to determine an average amplitude over multiple groups of pulses of the laser pulse set.

In some embodiments, the discriminator is adapted to recognize the signature of each detected laser pulse set by: determining respective detection times of pulses of the laser pulse set, determining a time difference between the detection times, and correlating the time difference with a signature of an emitted pulse set.

In some embodiments, the discriminator is adapted to recognize the signature of each detected laser pulse set by determining respective wavelengths of pulses of the laser pulse set, and correlating the determined wavelengths with a signature of an emitted pulse set.

In some embodiments, the apparatus comprises a correlator adapted to: determine, for each emitted pulse set, a start time and associating the start time with the selected signature of the emitted pulse set; determine, for each detected laser pulse set, a stop time for the detected pulse set; and associate the stop time with a start time which is associated with a signature corresponding to the signature of the detected pulse set.

In some embodiments, for each detected laser pulse set, the stop time and the associated start time comprise a couple from for use in determining a time of flight.

In some embodiments, the laser source is adapted to emit multiple laser pulse sets prior to detection by the detector of a laser pulse set, and wherein a correlator is adapted to uniquely identify each detected laser pulse set by signature with an emitted laser pulse set.

In some embodiments, the apparatus comprises a correlator adapted to, for each signature: store in association with the signature a start time of each emitted laser pulse set having the signature; correlate a stop time of each detected laser pulse set recognized as having the signature with a start time stored in association with the signature; store the stop time in association with the correlated start time to form a start-stop couple for the signature; and retrieve the stored start-stop couple in the order in which it was stored. In some embodiments, the apparatus is adapted to, for each signature, void a stop time stored in association with the signature after retrieving the stored start-stop couple and before storing a subsequent start time of an emitted laser pulse set having the signature.

BRIEF DESCRIPTION OF DRAWING FIGURES

These and other aspects and features of the present invention will be more readily understood from the embodiments described below with reference to the drawings, in which:

FIG. 2A shows an example of an emitted single pulse and a corresponding return pulse having an echo;

FIG. 2B shows a scenario in which the measurement error of FIG. 2A can arise;

FIG. 2C shows another view of the scenario of FIG. 2B;

FIG. 2D shows another example of the corresponding return pulse of an emitted single pulse in which the measurement error of FIG. 2A can arise;

FIG. 2E shows another example of the corresponding return pulse of an emitted single pulse in which the measurement error FIG. 2A can arise;

FIG. 2F shows a further example of the corresponding return pulse of an emitted single pulse in which the measurement error of FIG. 2A can arise;

FIG. 2G shows an elevation view of a light pulse incident at an oblique angle on a pipe in front of a wall and the resulting elliptical laser spot;

FIG. 2H shows the detected pulse resulting from the scenario of FIG. 2G;

FIG. 4 shows an example in which individual return pulses are detected;

FIG. 5 shows an example in which return bipulses are detected;

FIG. 6A shows an example of an emitted bipulse having a signature interval between subpulses;

FIG. 6B shows an example of a received bipulse in which amplitude of the return subpulses is substantially the same;

FIG. 6C shows the imperfect capture of the subpulse shapes by the analog detection electronics;

FIG. 6D shows the effect of digitization of the captured analog subpulses;

Figure 7:
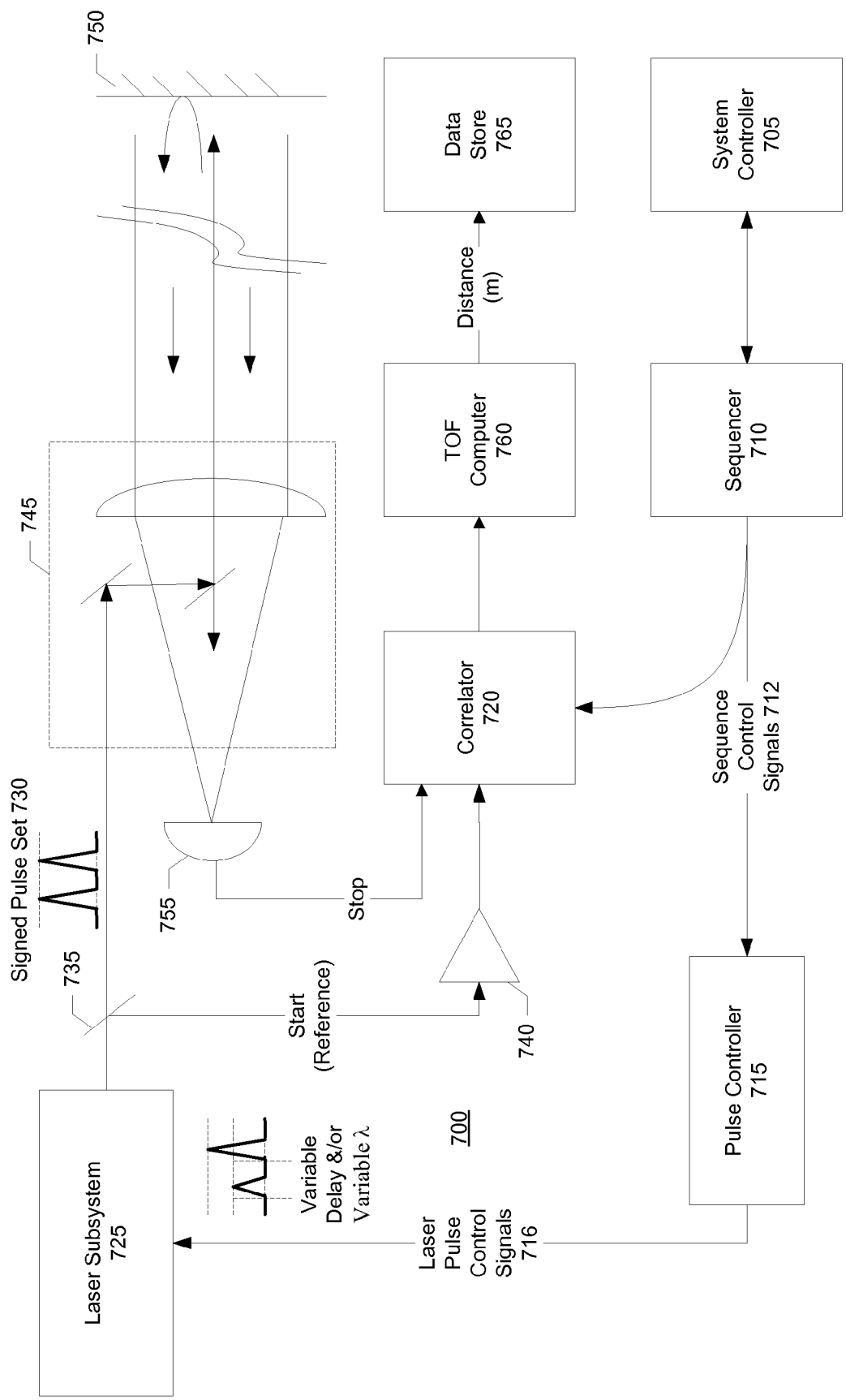
Figure 8:
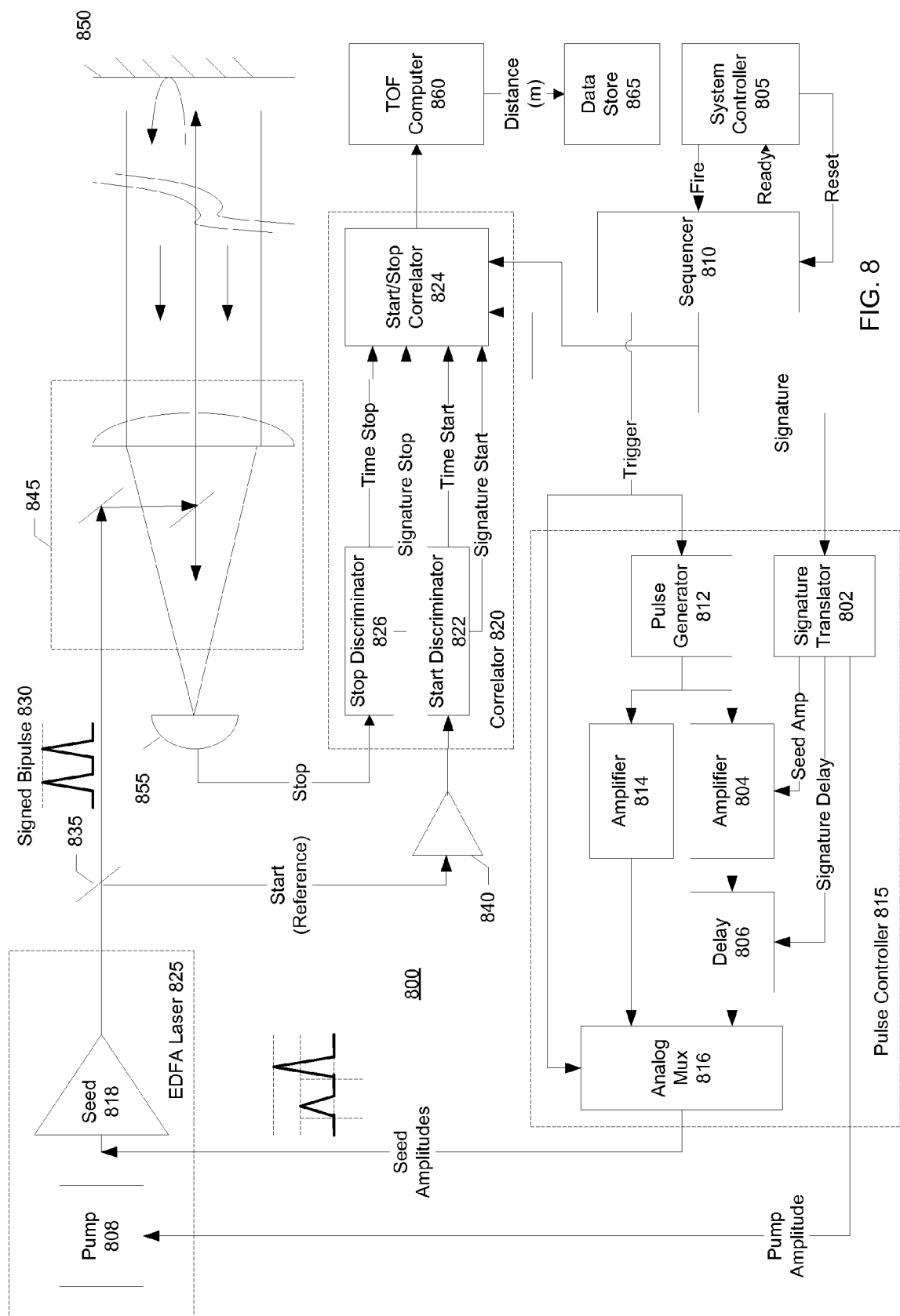
Figure 9:
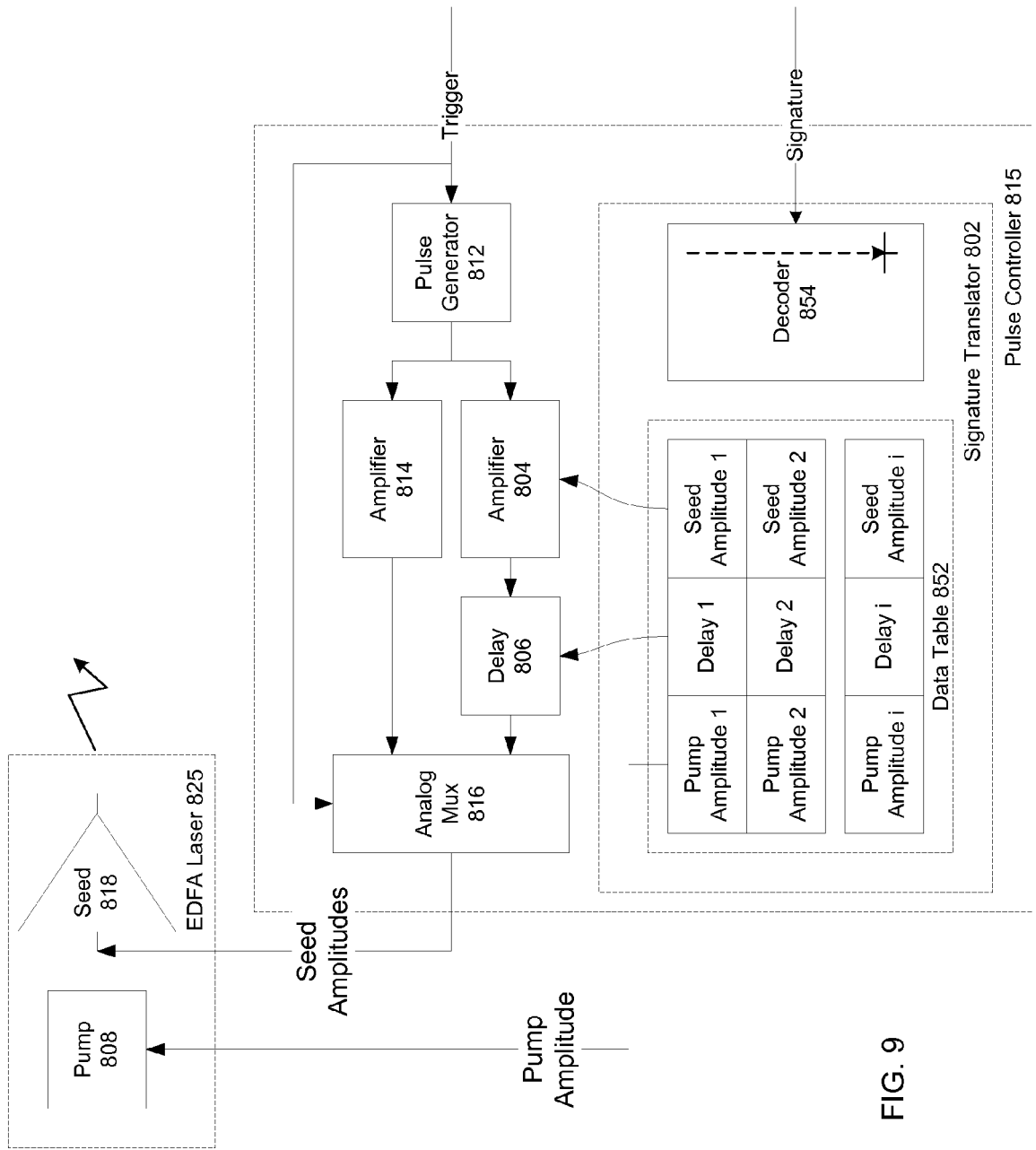
Figure 10:
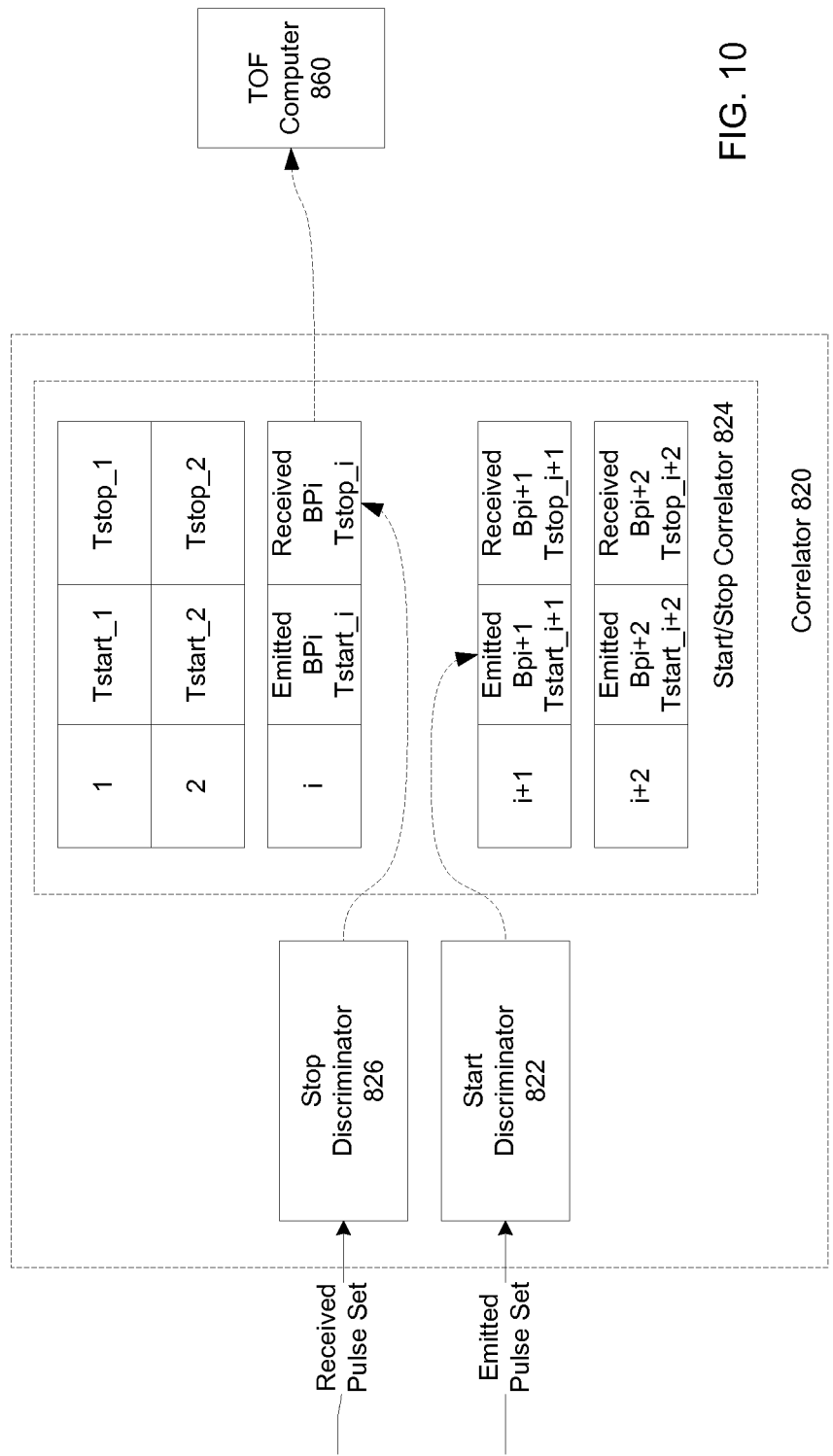
Figure 11:
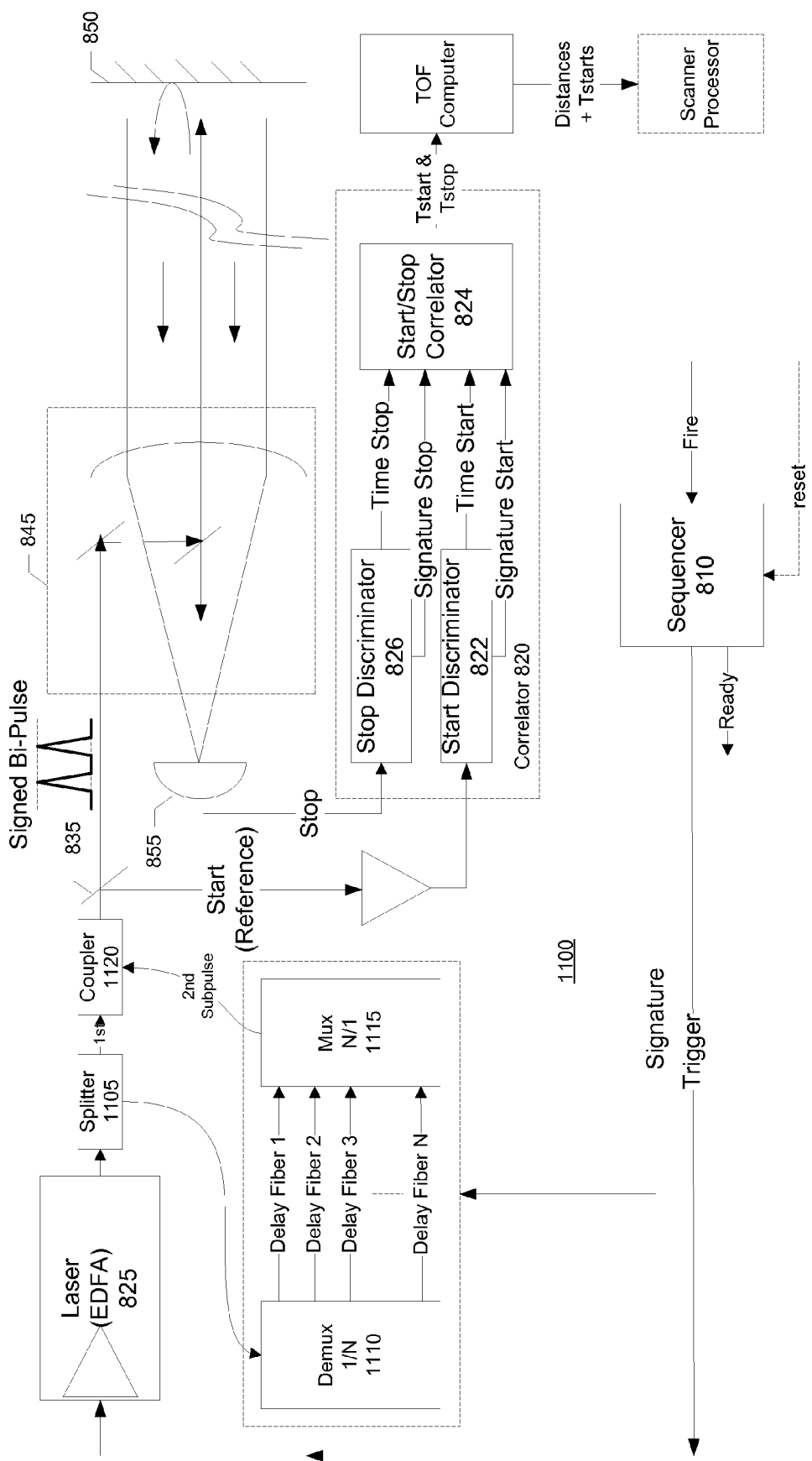
Figure 12A:
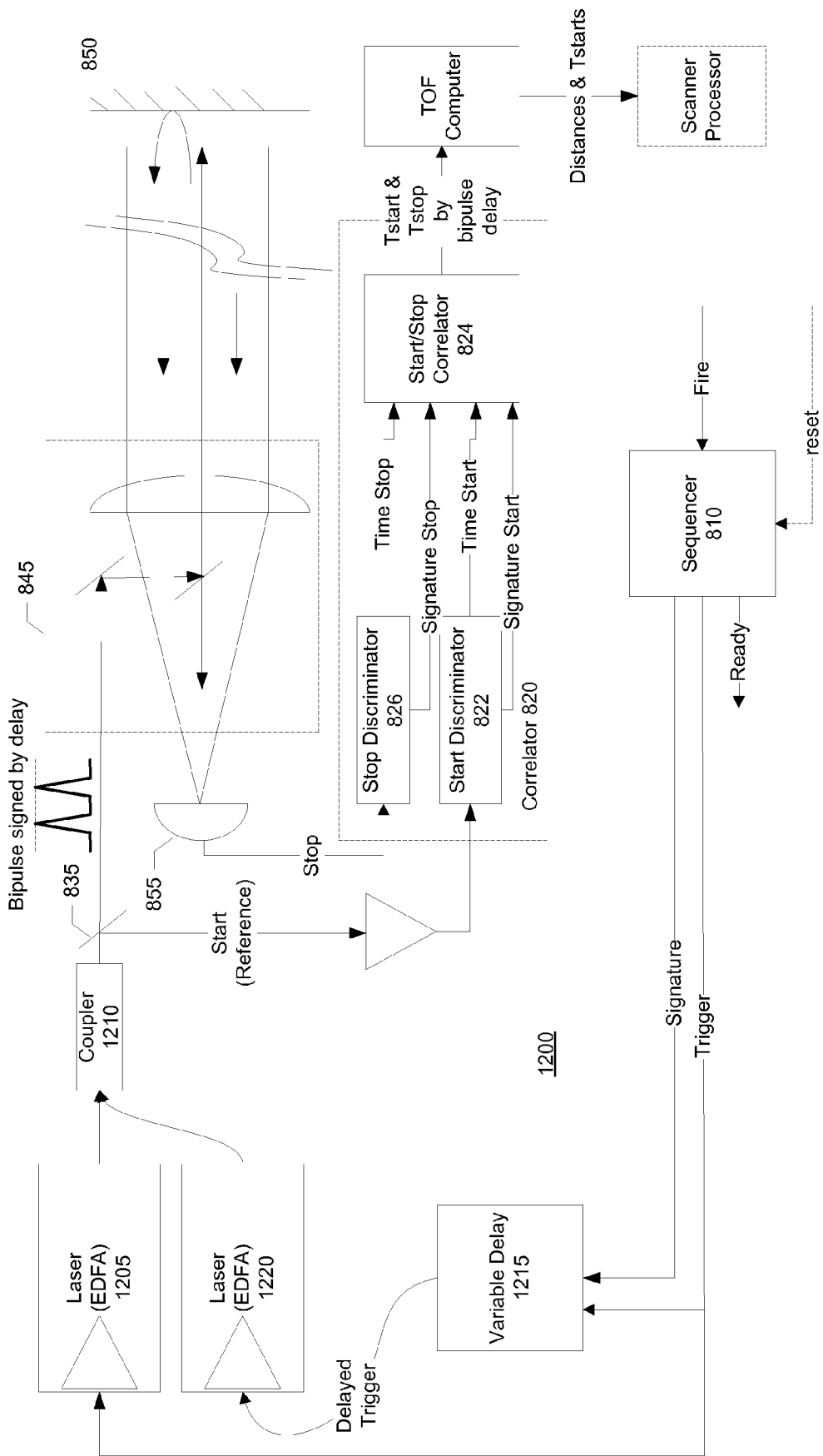
Figure 12B:
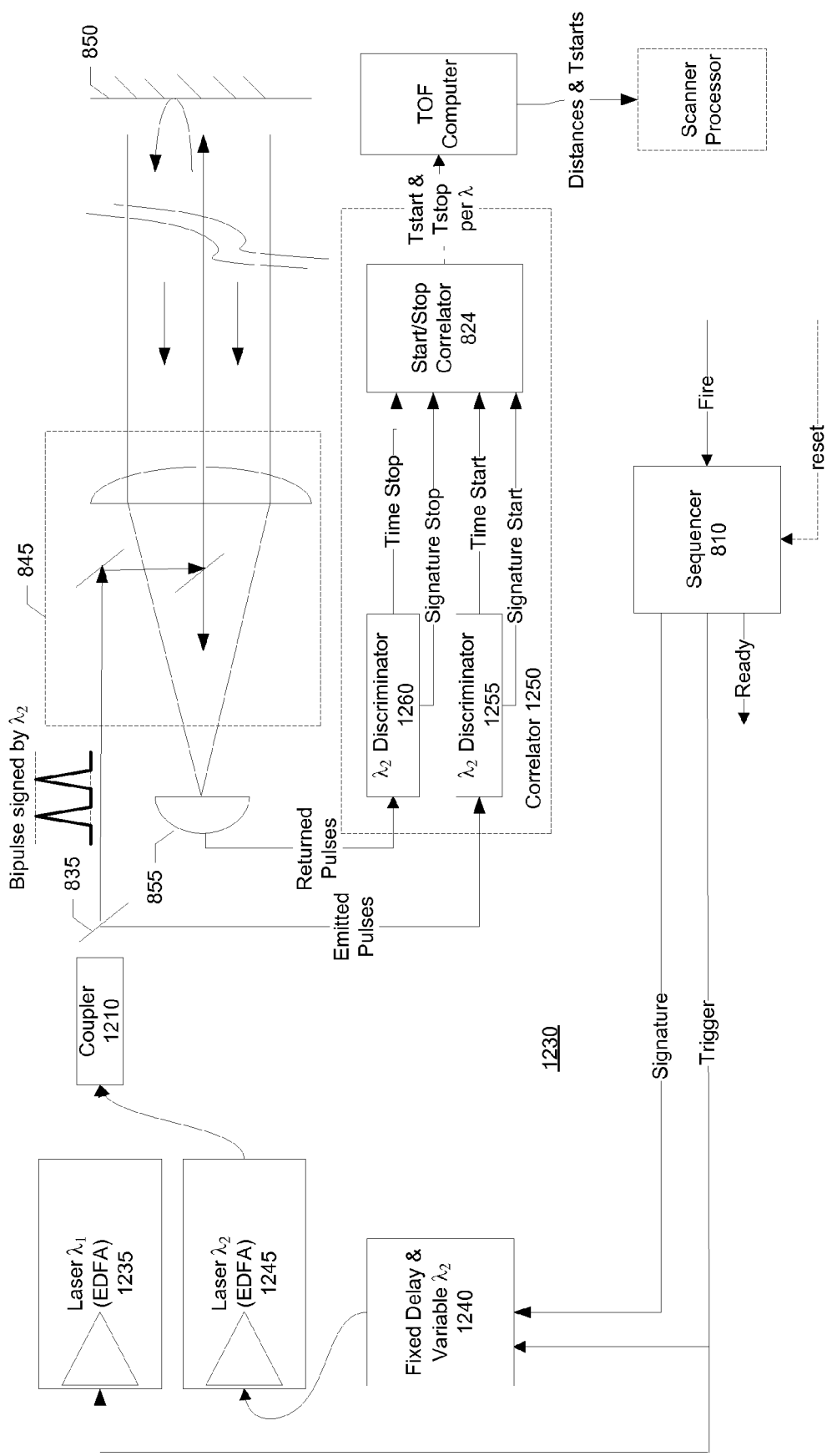
Figure 12C:
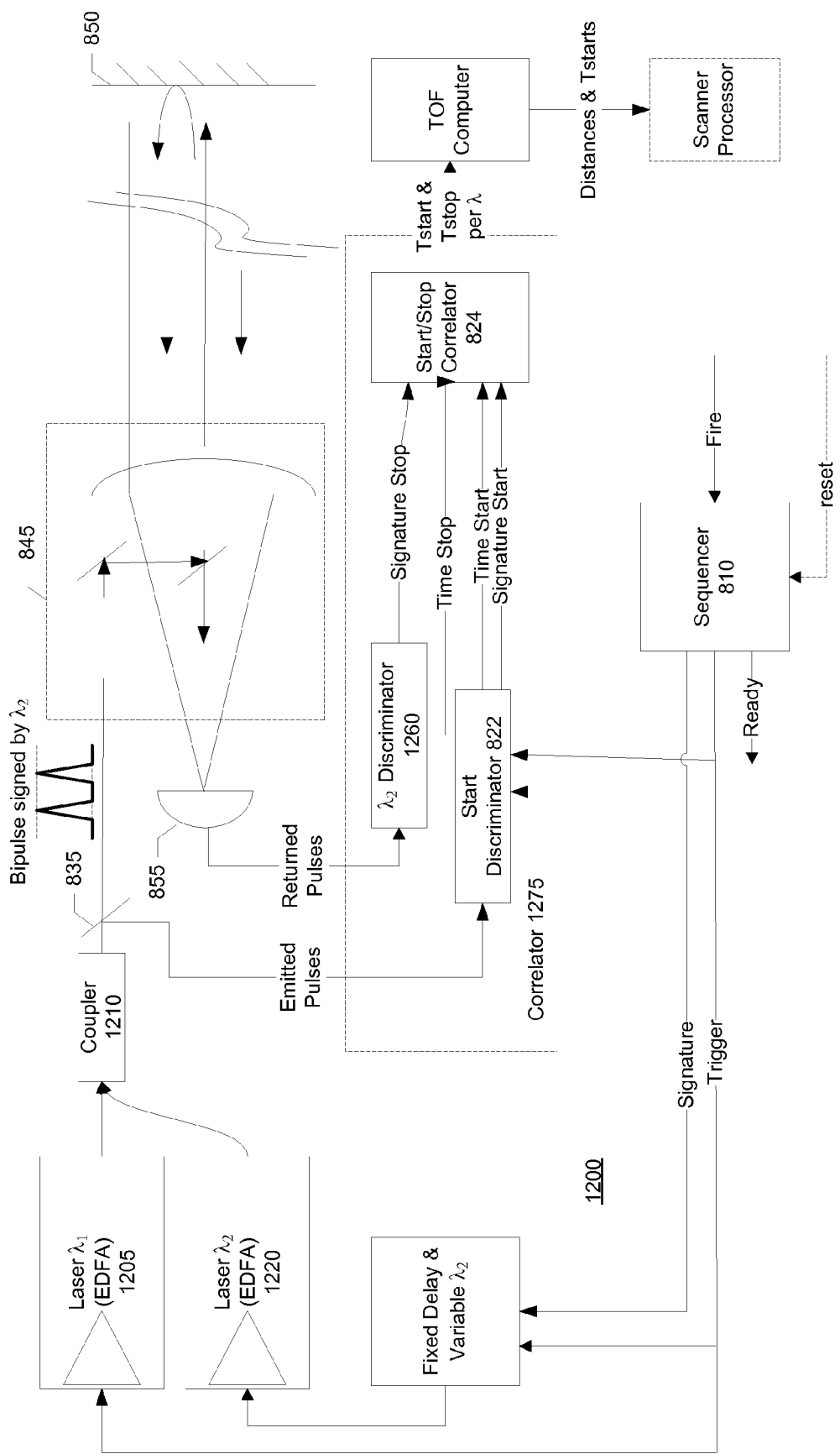
Figure 13A:
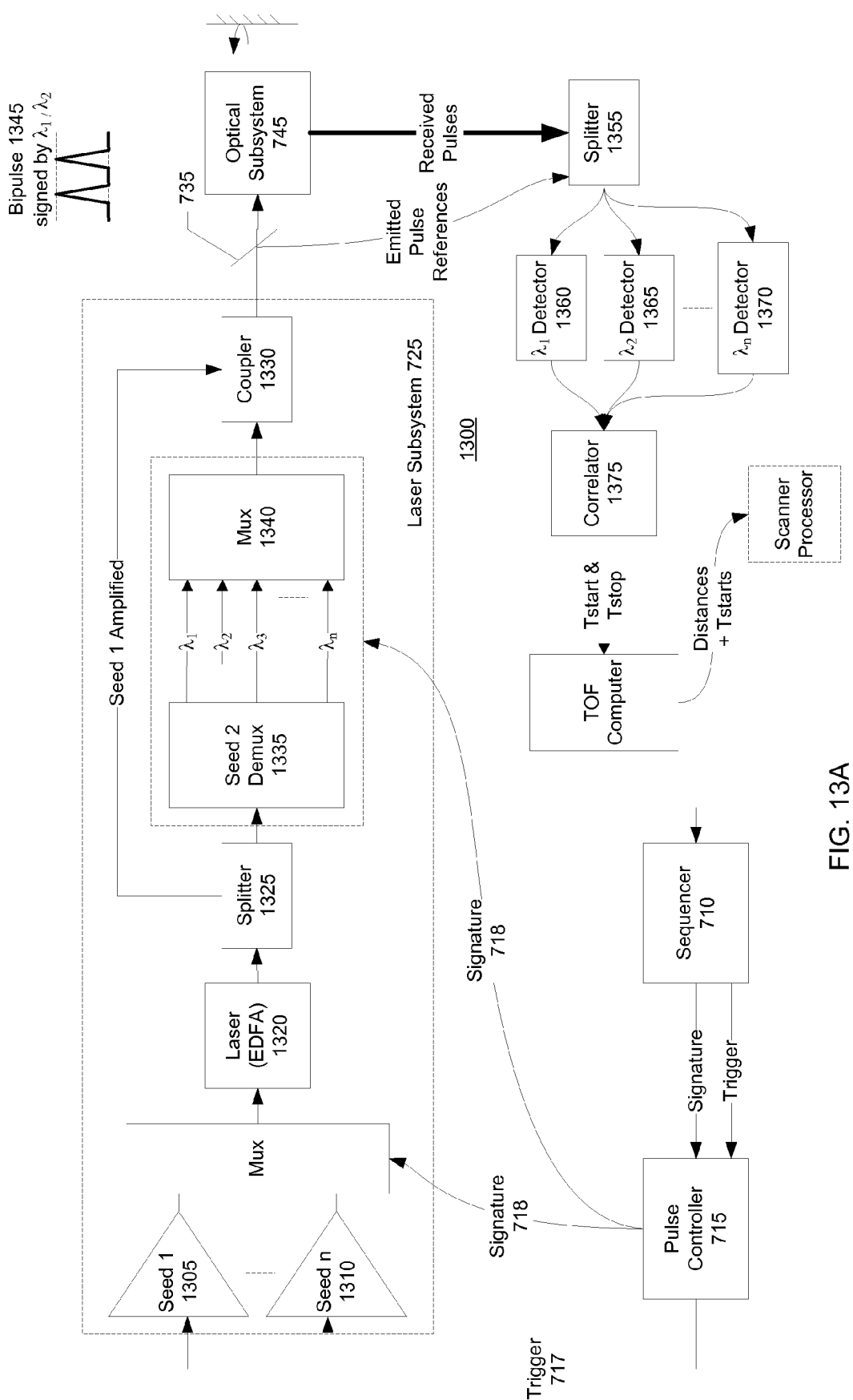
Figure 13B:
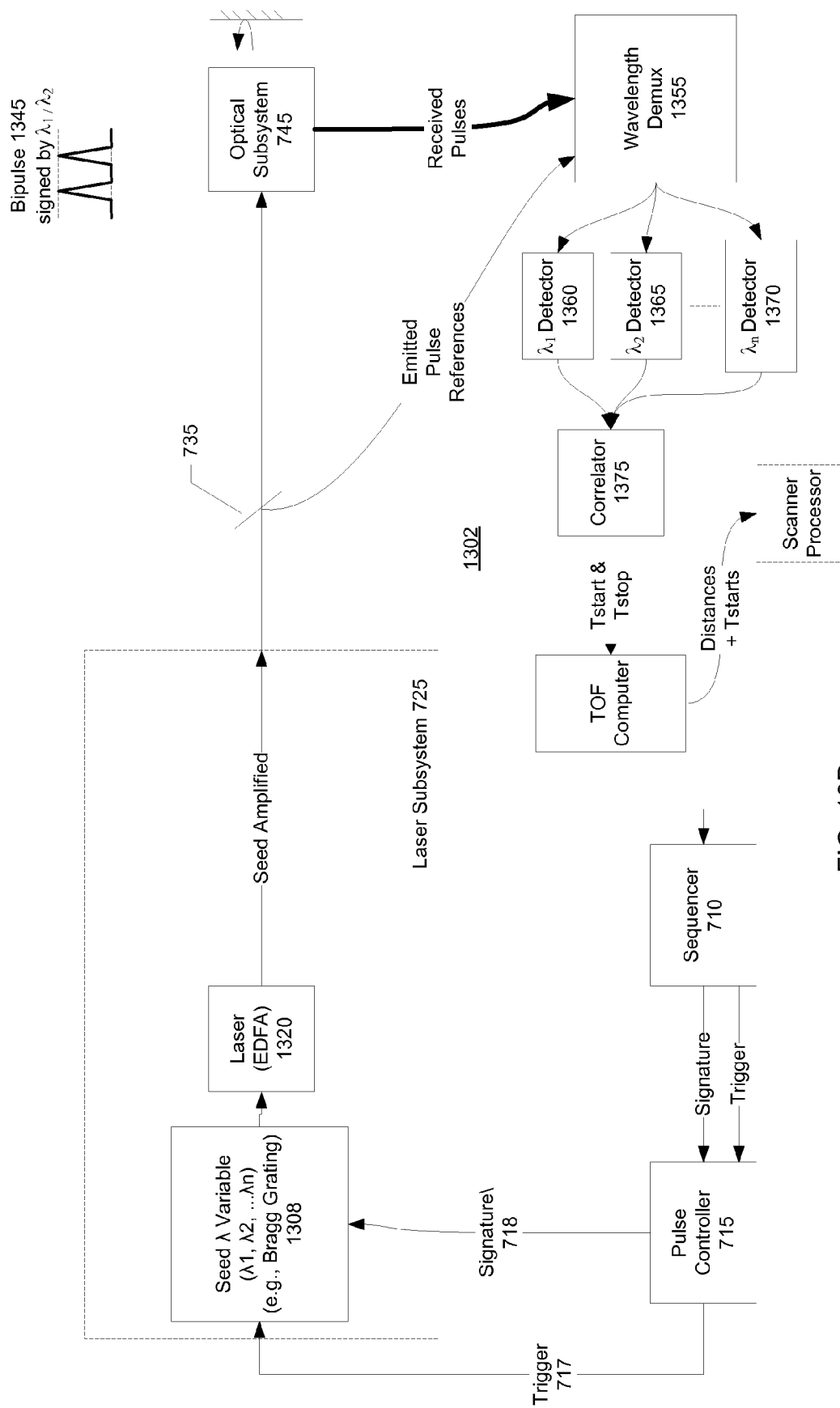
Figure 14A:
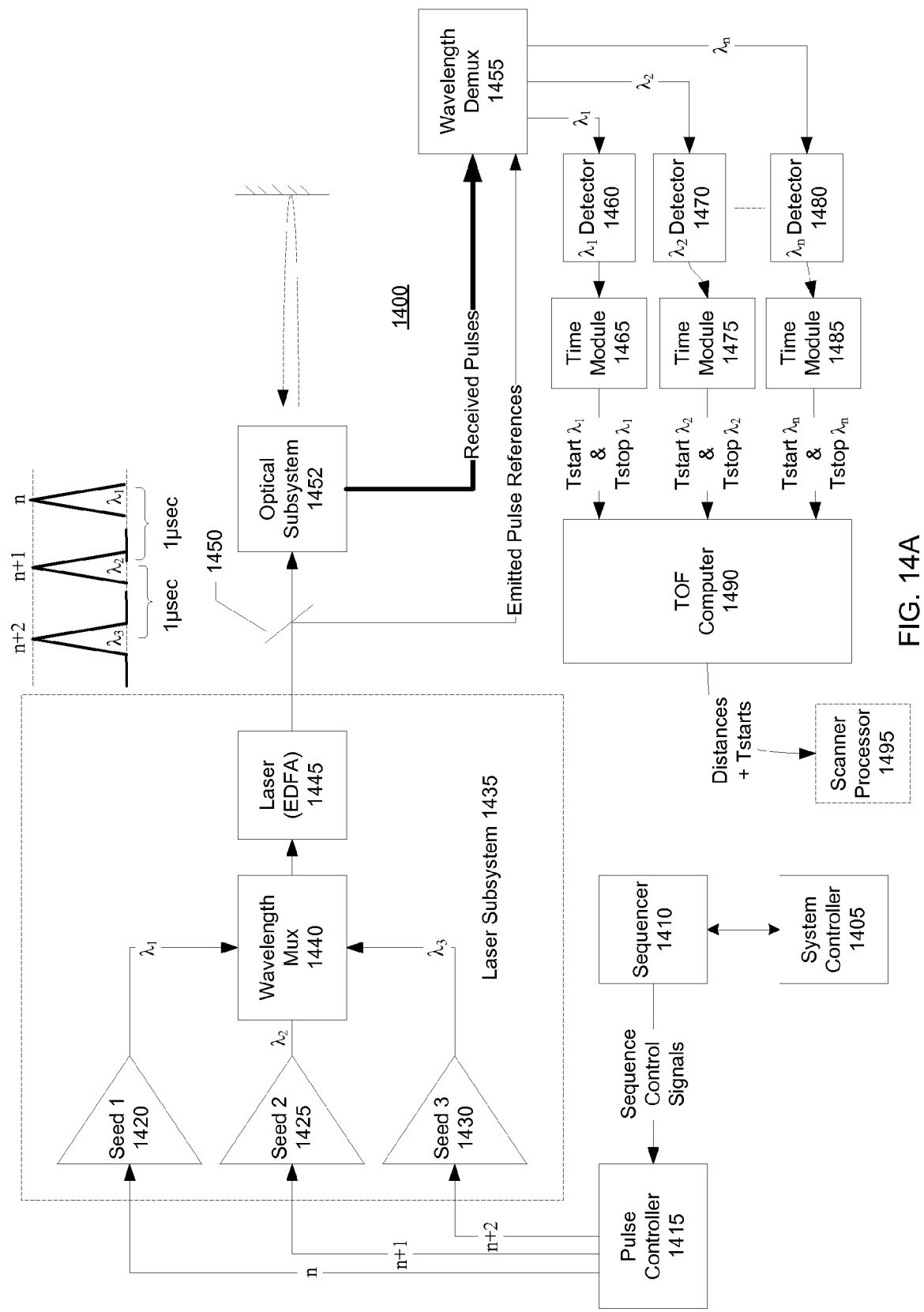
Figure 14B:
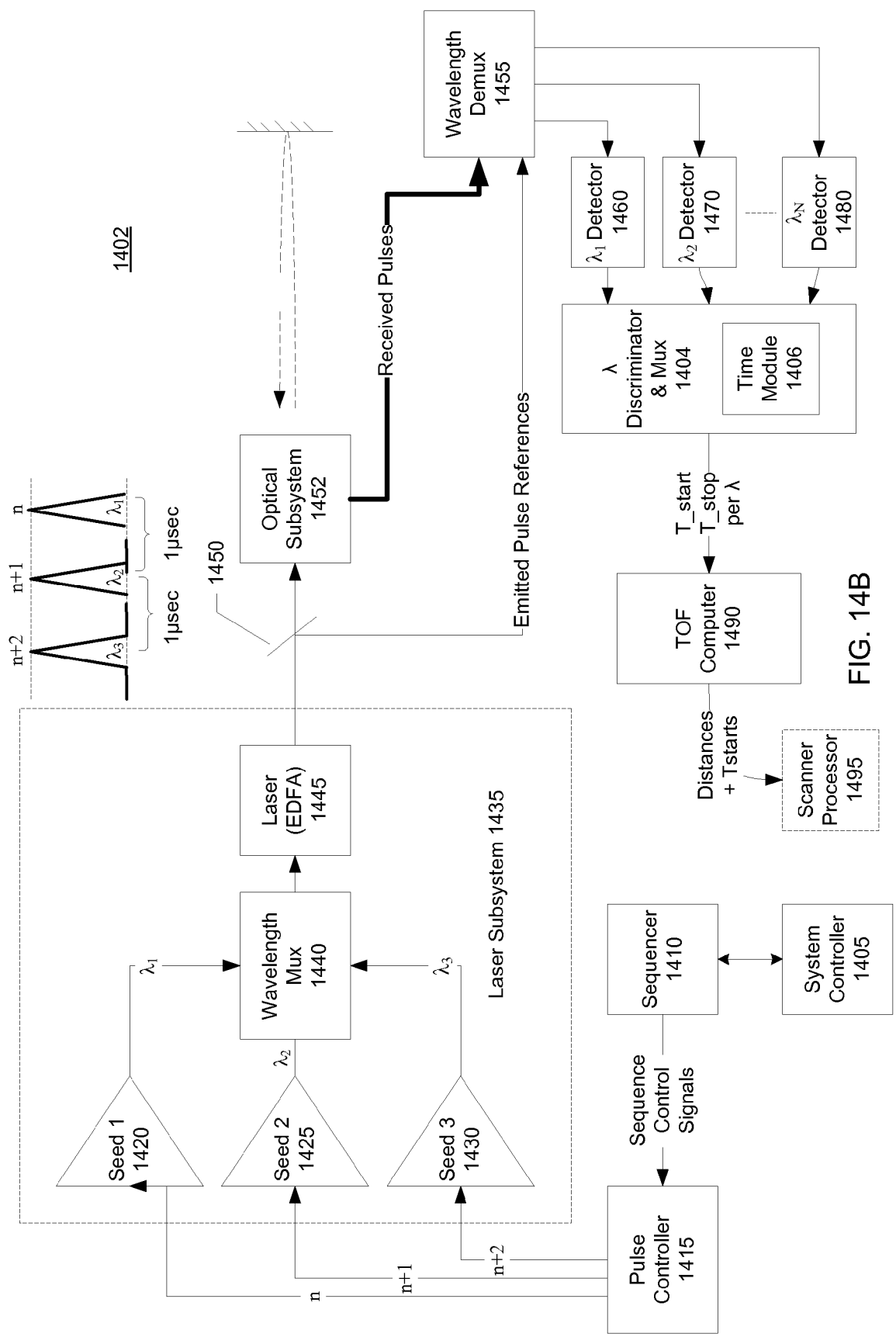
Figure 15:
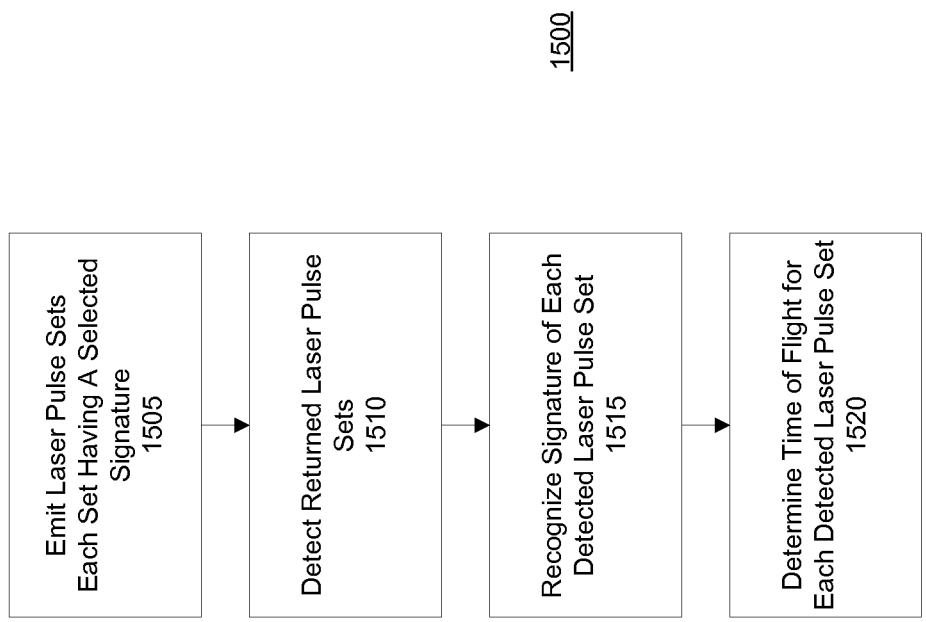

FIG. 7 schematically illustrates a system for implementing a signed bipulse measurement scheme in accordance with some embodiments of the invention;

FIG. 8 shows a system for implementing a signed bipulse measurement scheme in accordance with some embodiments of the invention;

FIG. 9 schematically shows the operation of a signature translator in accordance with some embodiments of the invention;

FIG. 10 shows in more detail an embodiment of a correlator in accordance with some embodiments of the invention;

FIG. 11 schematically illustrates a system for generating signed laser bipulses in accordance with some embodiments of the invention;

FIG. 12A schematically illustrates at a system for generating signed laser bipulses in accordance with some embodiments of the invention;

FIG. 12B schematically illustrates a variant of the system of FIG. 12A;

FIG. 12C schematically illustrates a further variant of the system of FIG. 12A;

FIG. 13A schematically illustrates elements of a system such as the system of FIG. 7;

FIG. 13B schematically illustrates elements of a system such as the system of FIG. 7;

FIG. 14A schematically illustrates elements of a system in which pulse sets have three subpulses per set in accordance with some embodiments of in the invention;

FIG. 14B shows a variant of the system of FIG. 14A;

FIG. 14C shows an example in which a pulse set having subpulses of differing frequencies is emitting and received; and FIG. 15 is a flow diagram of a method in accordance with some embodiments of the invention.

DETAILED DESCRIPTION

A design goal for a highly versatile time-of-flight scanner is, for example, to enable distance measurements in a first mode with one million points per second for a scanning distance from 40 meters up to 100 meters and in a second mode with one hundred thousand points per second for a scanning distance up to 400 meters. Up to a distance of about 150 m there is no ambiguity when using single pulses at up to 1 million points per second. Measuring at 4 million points per second, ambiguity arises at a distance of only 37.5 m and with non-cooperative targets.

Some embodiments in accordance with the invention enable increased scanning rate by emitting laser pulse sets having a signature which enable correlation of each detected return pulse set with the corresponding emitted pulse set.

The above-mentioned design goal is feasible for example with pulses of around 1.5 ns pulse width emitted at a rate of 1 MHz in pulse sets having pulses separated with a delay of, e.g., 0-5 ns. For example, a first signature is characterized by a separation of 3 ns between pulses of a set, a second signature is characterized by a separation of 3.5 ns between pulses of a set, and a third signature is characterized by a separation of 4 ns between pulses of a set.

International Publication Number WO 2009/039875 A1 describes a detection system which is useful to make time-of-flight measurements at a high rate and at a long distance. Such a system can be used in a scan for use indoors as well as outdoors. The range of such a system can be extended using features of the present embodiments in which the laser pulsed are signed and the signatures are used to avoid ambiguity when correlating detected return pulses with emitted pulses.

Alternatively, or in addition to using pulse spacing to characterize signatures, the laser pulses of a set may have respective different wavelengths so that a detected return pulse sets can be unambiguously correlated with an emitted pulse set. The number of possible signatures is a matter of design choice dictated by scanning speed and distance. The above-noted design goal could be achieved, for example, with three or four possible signatures.

FIG. 2A shows an example of an emitted single pulse 205 and a corresponding return pulse 210 having an "echo" 215. The "echo" results in a superposition of two echoes, one 210 in arrival time of the pulse 205 at time $\delta t$, the other one 215 in arrival time at time $\delta'$. FIG. 2B and FIG. 2C show a scenario in which such a measurement error can arise. In this example a pipe 225 of 2 cm diameter is spaced about 3 m in front of a wall 230 at a distance of, e.g., 500 m, where the laser pulse forms a spot 235 of about 5 cm diameter. Part of the laser pulse is reflected by the pipe, while part is reflected by the wall, resulting in deformation of the detected return pulse.

FIG. 2D shows another example of the corresponding return pulse of an emitted single pulse due to a reflection anomaly as in the example of FIG. 2B and FIG. 2C. As the distance between 225 and 230 is relatively large, the pulse is divided into pulses 240 and 245. FIG. 2E shows another example of the corresponding return pulse of an emitted single pulse due to a reflection anomaly as in the example of FIG. 2B and FIG. 2C; the distance between 225 and 230 is smaller, the two pulses 250 and 255 begin to be partially overlapped. FIG. 2F shows another example of the corresponding return pulse of an emitted single pulse due to a reflection anomaly as in the example of FIG. 2B and FIG. 2C; the distance between 225 and 230 is still smaller, the two pulses 260 and 265 are almost overlapped. The nature and degree of distortion of the detected bipulse in FIG. 2E and FIG. 2F is dependent on measurement conditions including target geometry.

FIG. 2G shows an elevation view of a light pulse incident at an oblique angle on a wall 275 and the resulting elliptical laser spot 280 of, e.g., 4 cm by 20 cm.

FIG. 2H shows the detected pulse resulting from the scenario of FIG. 2F. In this example an emitted pulse 280 of width $\delta t=1.5$ ns becomes a return pulse 285 of width $\delta t' \approx 2.5$ ns.

Figure 1:
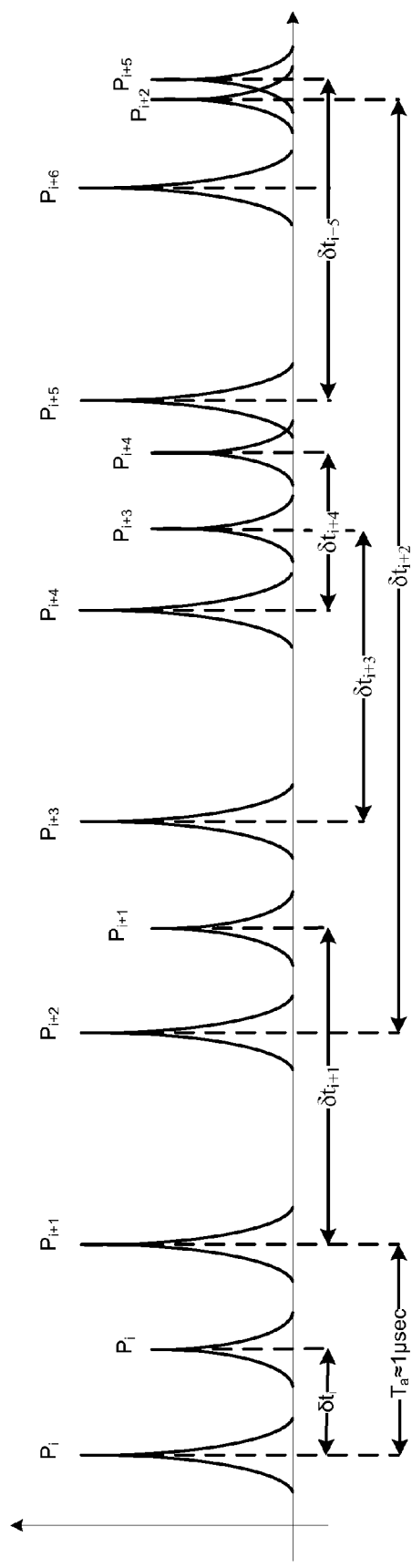
FIG. 1 illustrates a prior art problem with laser pulse distance measurement in which there is ambiguity as to which emitted pulse corresponds to which returned pulse.
Figure 3A:
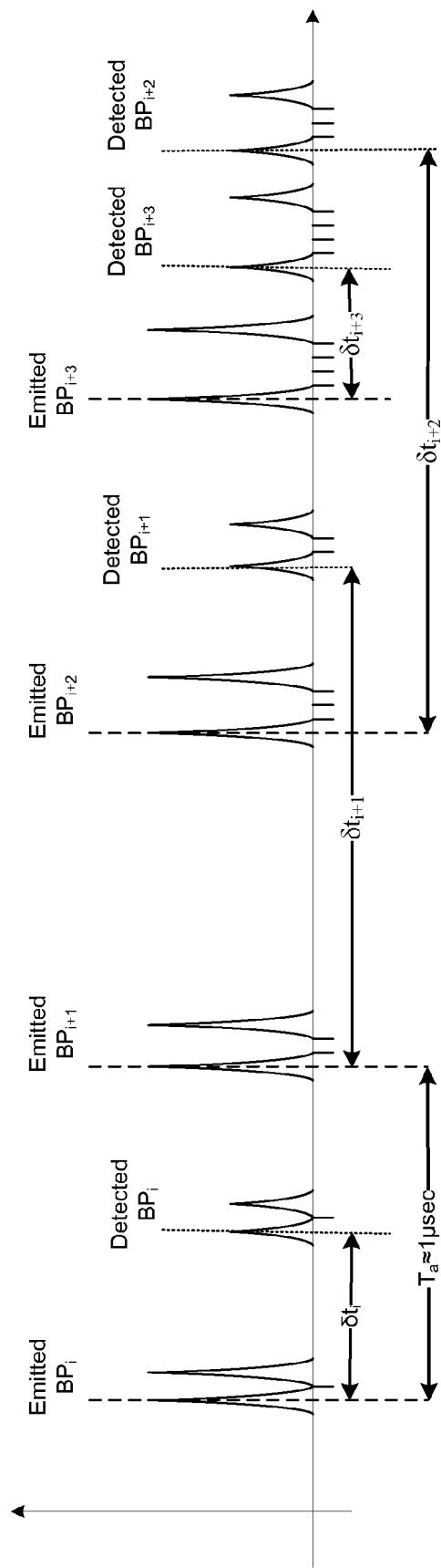
FIG. 3A illustrates an example of distance measurement using signed bipulses in accordance with some embodiments of the invention.

FIG. 3A illustrates an example of distance measurement using signed bipulses in accordance with some embodiments of the invention. In this example, a train of laser bipulses is emitted at intervals of $T_a \approx 1$ µsec, e.g., bipulses $BP_i$, $BP_{i+1}$, $BP_{i+2}$, $BP_{i+3}$, etc. Bipulse $BP_i$ has a "zero" interval between its two subpulses, bipulse $BP_{i+1}$ has a "single" interval between its two subpulses, bipulse $BP_{i+2}$ has a "double" interval between its two subpulses, and bipulse $BP_{i+3}$ has a "triple" interval between its two subpulses. Returned bipulse $BP_i$ is received at time $\delta t_i$, returned bipulse $BP_{i+1}$ is received at time $\delta t_{i+i}$, returned bipulse $BP_{i+2}$ is received at time $\delta t_{i+2}$, and returned bipulse $BP_{i+3}$ is received at time $\delta t_{i+3}$.

In this example, the intervals between subpulses serve as signatures for the bipulses. That is, the signature of each returned bipulse is determined from the interval between its subpulses. Each returned bipulse is correlated with an emitted bipulse having the same signature, thereby avoiding ambiguity in determining time of flight of each emitted bipulse.

Figure 3C:
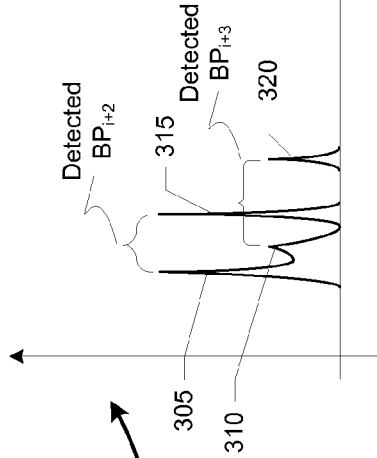
FIG. 3C shows a detector output for the returned bipulses of FIG. 3B, in which the returned bipulses are mixed.
Figure 3B:
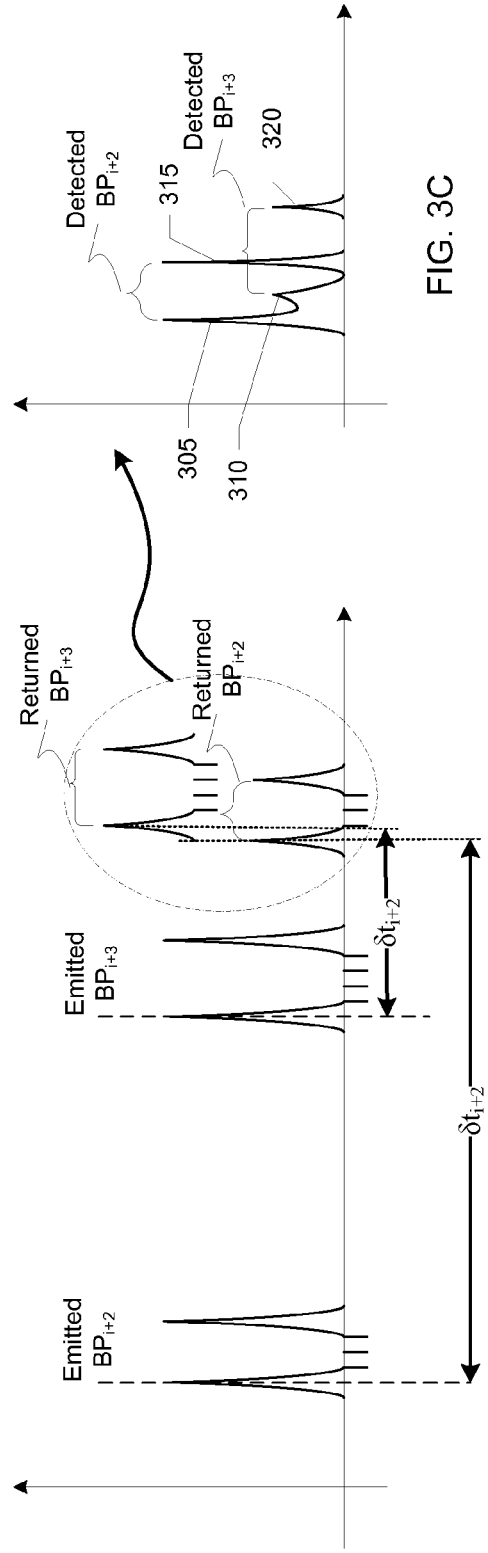
FIG. 3B shows an example where returned bipulses overlap in time.

FIG. 3B shows an example where returned bipulses overlap in time, e.g., returned bipulses $BP_{i+2}$ and $BP_{i+3}$. FIG. 3C shows a detector output for the returned bipulses of FIG. 3B, in which the returned bipulses are mixed. Discrimination is used in accordance with embodiments of the invention to either accept the measurements if they can be distinguished or to reject them if they cannot be distinguished. The mixed pulse with peaks at 305 and 310 would not allow discrimination and proper correlation with emitted single pulses. However, in combination with peaks 315 and 320 discrimination is possible with knowledge of the signatures of the emitted bipulses defined by spacing between the subpulses of each emitted bipulse. In this example the detected bipulses $BP_{i+2}$ and $BP_{i+3}$ are discriminated and matched with the corresponding emitted bipulses $BP_{i+2}$ and $BP_{i+3}$.

Pulses are detected in some embodiments using an avalanche photodiode (APD). APDs can be thought of as photo-detectors that provide a built-in first stage of gain through avalanche multiplication. From a functional standpoint, they can be regarded as the semiconductor analog to photomultipliers. Applying a reverse bias voltage to an APD produces internal current gain due to impact ionization (avalanche effect). Higher reverse bias voltage produces higher gain, but augmenting gain results in increased noise. An APD augments the signal to noise ratio up to its avalanche limit. Statistical noise is inherent with the stochastic APD multiplication process, resulting in random avalanche output spikes which appear as phantom returned pulses at the output of the detector.

FIG. 4 shows an example in which individual return pulses $P_i$, $P_{i+1}$ and $P_{i+2}$ are detected. In the time between detection of return pulses $P_{i+1}$ and $P_{i+2}$ an APD spike 405 occurs. It could not be possible to discriminate between the return pulses and the APD spike. Failure to reject the APD spike results in a false measurement when the APD spike is correlated with an emitted pulse and used to determine an incorrect time of flight of the emitted pulse.

FIG. 5 shows an example in which return bipulses $BP_i$, $BP_{i+1}$ and $BP_{i+2}$ are detected. In the time between detection of return bipulses $BP_{i+1}$ and $BP_{i+2}$ an APD spike 505 occurs. The bipulse returns are readily identified as such, and are correctly correlated with the respective bipulse emissions by recognizing the signature of each bipulse return. The APD spike is rejected as it does not match the signature characteristic of any emitted bipulse. Even if an APD spike were to overlap with a bipulse return so as to create ambiguity about the signature of the bipulse return, the ambiguity is recognized and the ambiguous bipulse return rejected along with the APD spike rather being used to determine an incorrect time-of-flight measurement.

Pulse amplitude declines inversely with the square of the measurement range. Some embodiments in accordance with the invention aid discrimination by relating the amplitude of the return pulse with the time of flight, e.g., to expect a return bipulse having an amplitude which is a fraction $$\frac{1}{d^2}$$

of the emitted bipulse amplitude, where d is the measurement range represented by the time of flight of the bipulse. This avoids the capture of very strong signals which are not far from saturation of the APD as well as capture of return bipulses from targets at a distance of less than about 40 m, assuming that such targets are not of interest to the user.

FIG. 6A shows an example of an emitted bipulse 605 having a signature interval $\theta_i$ between subpulses 610 and 615.

In principle the return bipulse 620 will likewise have a signature interval $\theta_i$ between subpulses 625 and 630 such that time interval $m_i$ is the same as time interval $m_i'$. The amplitude of the return bipulse 620 can vary significantly from that of the emitted bipulse 605 as a function of distance and target reflectivity.

However, determining the time of arrival of each subpulse raises practical issues due to detection noise in the analog pulse detection electronics and to digitization noise when converting the analog signals to digital values. FIG. 6B shows an example of a received bipulse in which amplitude of the return subpulses is much higher than the amplitude of the noise. FIG. 6C shows a noisy capture of the subpulse shapes by the analog detection electronics.

FIG. 6D shows the effect of digitization of the captured noisy analog subpulses with an analog-to-digital (ADC) converter, e.g., 8-bit ADC with 1 mv resolution from 0-255 my and 1 mv quantification noise. In some embodiments the received signal pulse is amplified by a variable gain, e.g., by 3× to an amplitude slightly less than the full scale of the ADC such that the quantization noise is negligible compared to the signal noise.

Some embodiments in accordance with the invention measure the time intervals $m_i$ and $m_i'$ and constrain these measurements such that $\theta_i$ and $\theta_{i'}$ is equal to aid in recognizing the bipulse signature. Some embodiments in accordance with the invention take an average value of the time intervals $m_i$ and $m_i'$, e.g., $$\frac{m_i + m_i'}{2}$$

to improve the accuracy of the resulting time of flight measurement. The use of a bipulse reduces the noise of the measure of the pulse arrival detection by a factor of the square root of the number of pulses, e.g., by a factor of $\sqrt{2}$.

Using a bipulse signature is a good compromise as compared with a multi-pulse signature which has more possibilities for quantification. Some embodiments in accordance with the invention use more than two pulses to define a multi-pulse signature, so that the noise of the measure of the pulse arrival detection is reduced by a factor of the square root of the number n of pulses, e.g., by a factor of $\sqrt{n}$.

FIG. 7 schematically illustrates a system 700 for implementing a signed bipulse measurement scheme in accordance with some embodiments of the invention. A system controller 705 issues a command to start a measurement. A sequencer 710 responds to the command by generating sequence control signals 712 and supplying these to a pulse controller 715 and to a pulse correlator 720. The sequence control signals define a signature selected from a group of possible signatures. Pulse controller 715 issues pulse control signals 716 to a laser subsystem 725. Laser subsystem 725 responds by emitting a "signed" laser pulse sequence such as a laser bipulse 730. The signature of the pulse sequence is defined by one or more characteristics which enable discrimination between pulse sequences having different signatures, e.g., by different time intervals between subpulses of a bipulse and/or different wavelengths of subpulses. The signed laser pulse sequence passes through a splitter 735. A portion of the energy from the laser pulse sequence is passed to a detector element 740 to provide a "start" reference indicating to correlator 720 the time of emission of the laser pulse sequence. A portion of the energy from the laser pulse sequence is passed through an optical subsystem 745 and directed at a target external to the system 700. The return laser pulse sequence from target 750 passes through the optical system 745 to a detector 755. Detector 755 provides a "stop" reference indicating to correlator 720 the time of detection of the return laser pulse sequence. Correlator 720 matches the "start" reference and the "stop" reference based on the signatures of the emitted laser pulse sequence and the detected laser pulse sequence and determines a corresponding time of flight for the laser pulse sequence. A time-of-flight computer 760 converts the time-of-flight value to a corresponding measurement distance which is, for example, stored in a data store 765. The time-of-flight computer 760 may be a separate processor or may be a process running in a computer which also runs the process of system controller 705 and/or other processes. Functionality is described here with reference to particular elements of FIG. 7 for convenience of illustration, but can be combined in one or more elements or assigned to other elements as may be convenient.

FIG. 8 shows a system 800 for implementing a signed bipulse measurement scheme in accordance with some embodiments of the invention. A system controller 805 issues a "fire" command to start a measurement. A sequencer 810 responds to the command by generating sequence control signals comprising a trigger signal and a signature signal to a pulse controller 815 and a pulse correlator 820. The signature signal defines a signature selected from a group of possible signatures, e.g., as illustrated in FIG. 3A. Pulse controller 815 issues pump amplitude control signals and seed amplitude control signals to an EDFA laser subsystem 825. Laser subsystem 825 responds by emitting a "signed" laser pulse sequence such as a laser bipulse 830. The signed laser pulse sequence passes through a splitter 835. A portion of the energy from the laser pulse sequence is passed to a detector element 840 to provide a "start" reference indicating to correlator 820 the time of emission of the laser pulse sequence. A portion of the energy from the laser pulse sequence is passed through an optical subsystem 845 and directed at a target external to the system 800. The return laser pulse sequence from target 850 passes through the optical system 845 to a detector 855. Detector 855 provides a "stop" reference indicating to correlator 820 the time of detection of the return laser pulse sequence. Correlator 820 matches the "start" reference and the "stop" reference based on the signatures of the emitted laser pulse sequence and the detected laser pulse sequence and determines a corresponding time of flight for the laser pulse sequence. A time-of-flight computer 860 converts the time-of-flight value to a corresponding measurement distance which is, for example, stored in a data store 865. The time-of-flight computer 860 may be a separate processor or may be a process running in a computer which also runs the process of system controller 805 and/or other processes. Functionality is described here with reference to particular elements of FIG. 8 for convenience of illustration, but can be combined in one or more elements or assigned to other elements as may be convenient.

A signature translator 802 responds to the signature signal by providing a seed amplitude value to an amplifier 804, a pulse delay value to a delay element 806, and pump amplitude value to a laser pump 808. A pulse generator 812 responds to the trigger signal by providing a pulse to an amplifier 814 and to amplifier 804. The gain of amplifier 814 defines a seed amplitude for the first subpulse of a bipulse. The gain of amplifier 804 is set by the seed amplifier signal from signature translator 802, and defines a seed amplitude for the second subpulse of a bipulse. The amplified pulse from amplifier 814 is passed to an analog multiplexer 816. Delay element 806 delays the amplified pulse from amplifier 804 by an amount defined by the delay signal from translator 802, and passes the delay pulse from amplifier 804 to analog multiplexer 816. Analog multiplexer 816 passes the combined seed amplitude pulses to the seed laser source 818 of laser subsystem 825. The aim of the pulse controller scheme is to provide seed amplitude pulses which are spaced in time to define the selected signature and which have amplitudes which take account of the recovery time of the laser subsystem 825 so that the subpulses of the emitted signed bipulse 830 will be of the same amplitude.

Correlator 820 receives the start reference signal from detector 840 signaling the emission time of the signed bipulse. A start time discriminator 822 signals to a start/stop correlator element 824 the start time of a measurement period associated with the signature of the emitted laser bipulse 830. A stop time discriminator 826 signals to start/stop correlator element 824 the end of a measurement period associated with the signature of the detected laser bipulse. Start/stop correlator element 824 matches the start and stop times of the bipulse by signature and passes these to the time-of-flight computer 860 which determines the time of flight for the signed bipulse. Since multiple signatures are available for selection, it will be understood that a number of laser bipulses may be in flight at the same time, and that the correlator 820 will match the start time of each emitted laser bipulse with the stop time of the detected bipulse having the same signature. The number of signatures available for selection is sufficient to avoid ambiguity given the design parameters of emission rate and measurement distance range. The example of FIG. 8 is intended to illustrate the system functionality at a high level. Individual elements and subassemblies may be substituted or rearranged as desired to provide similar functionality.

FIG. 9 schematically shows the operation of signature translator 802. A data table 852 contains a set of values for each signature 1, 2, . . . i. The values for each signature include a pump amplitude, a delay and a seed amplitude. The delay defines the signature of the bipulse by determining the interval between the subpulses of the bipulse. The pump amplitude and seed amplitude values are matched to the delay interval between the subpulses, taking account of the recovery time of laser subsystem 825 such that the amplitudes of the subpulses of each bipulse will be independent of the delay interval between the subpulses. A decoder 854 responsive to the signature signal from sequencer 810 retrieves the values corresponding to the signature signal from the data table 852.

FIG. 10 shows in more detail an embodiment of a correlator 820. Start time discriminator 822 receives the start signal from detector 840 and the signature from sequencer 810, and stores these together in start/stop correlator 824. Stop time discriminator 826 receives the signal from detector 855, recognizes the delay between subpulses of the detected bipulse, and matches the stop time with the previously stored start time for that signature in start/stop correlator 824. The matched start/stop time couple is passed to the time-of-flight computer 860. Referring for example to FIG. 3A, the start time of a bipulse of signature i is stored as a value Tstart_i, the start time of a subsequent bipulse of signature i+1 is stored as a value Tstart_i+1, etc. When a bipulse of signature i is detected by stop discriminator 826, the stop time of that bipulse is matched with Tstart_i and recorded as a value Tstop_i. The couple Tstart_i and Tstop_i are passed to time-of-flight computer 860. The values of Tstart_i and Tstop_i are voided to prepare for fresh entries of these parameters so that signature i can be reused. Similarly, when a bipulse of signature i+1 is detected by stop discriminator 826, the stop time of that bipulse is matched with Tstart_i+1 and recorded as a value Tstop_i+1. The couple Tstart_i+1 and Tstop_i+1 are passed to time-of-flight computer 860. The values of Tstart_i+1 and Tstop_i+1 are voided to prepare for fresh entries of these parameters when the signature i+1 is to be reused.

The number of Tstop_i corresponding and correlated to Tstart_i could be greater than 1: that corresponds to a first target, or a succession of targets which do not completely intercept the laser beam and successively reflect the laser light emitted at Tstart_i giving different stop bipulses detected at Tstop_ij. The correlator 820 and all other correlators herein can handle these different couples (Tstart_i; Tstop_ij) and pass these different couples to the time of flight computer which computes the corresponding distances.

FIG. 11 schematically illustrates at 1100 a system using another approach to generating signed laser bipulses in accordance with some embodiments of the invention. In this approach a trigger pulse from sequencer 810 causes laser subsystem 825 to supply a single laser pulse to an optical splitter 1105. A portion of the laser pulse is passed to a 1-to-N demultiplexer 1110. Demultiplexer 1110 feeds a selected one of a number N of delay elements, e.g., delay fibers 1, 2, . . . N, which in turn feed into an N-to-1 multiplexer The selection of which delay element to feed is determined by the signature signal from sequencer 810. The number N of delay elements corresponds to the number of signatures to be provided. The non-delayed output of splitter 1105 and the signature-delayed output from multiplexer 1115 are passed to an optical coupler 1120 which supplies the signed laser bipulse to be emitted through optical subsystem 845. Detection and correlation of bipulses returned from target 850 are performed, for example, as described above.

FIG. 12A schematically illustrates at 1200 a system using another approach to generating signed laser bipulses in accordance with some embodiments of the invention. In this approach a trigger pulse from sequencer 810 causes a first laser subsystem 1205 to supply a single laser pulse to a first input of an optical coupler 1210. The signature signal from sequencer 810 controls the delay of a variable delay element 1215. The trigger pulse from sequencer 810 as delayed by delay element 1215 causes a second laser subsystem 1220 to supply a single laser pulse to a second input of optical coupler 1210. The first laser pulse and the delayed second laser pulse are combined in coupler 1210 to form the signed bipulse emitted via optical subsystem 845. Detection and correlation of bipulses returned from target 850 are performed, for example, as described above.

Some embodiments in accordance with the invention have laser pulses of different wavelengths between pulse sets or within a pulse set, e.g., a first subpulse of a bipulse having a first wavelength $\lambda_1$ and a second subpulse of a bipulse having a second wavelength $\lambda_2$ different from the first wavelength. The use of different wavelengths is in lieu of or in addition to the use of variable intervals between subpulses to distinguish signatures of pulse sets.

For example, a reference wavelength $\lambda_0$ is used for a first subpulse, and the signature is defined by selecting one of wavelengths $\lambda_1, \lambda_2, \lambda_N$ for the second subpulse of a bipulse or for one or more subsequent subpulses of a multipulse set. The wavelengths are, for example, $\lambda_0=1510$ nm, $\lambda_1=1530$ nm, $\lambda_2=1550$ nm, $\lambda_3=1570$ nm for a group of three signatures. In the example of FIG. 12, the wavelength of the first laser subsystem 1205 can be the same as or different than the wavelength of the second laser subsystem 1220.

FIG. 12B schematically illustrates at 1230 a variant of the system of FIG. 12A using different wavelengths to distinguish signed laser bipulses in accordance with some embodiments of the invention. In this example a trigger pulse from sequencer 810 causes a first laser subsystem 1235 to supply a single laser pulse of to a first wavelength $\lambda_1$ to the input of an optical coupler 1210. The signature signal from sequencer 810 controls the wavelength $\lambda_2$ of a variable delay element 1240, which is shown as having a fixed delay but could include a variable delay as in the example of FIG. 12A. The trigger pulse from sequencer 810 as delayed by delay element 1240 causes a second laser subsystem 1245 to supply a single laser pulse of wavelength $\lambda_2$ to a second input of optical coupler 1210. The first laser pulse and the delayed second laser pulse are combined in coupler 1210 to form the signed bipulse emitted via optical subsystem 845. Detection and correlation of bipulses returned from target 850 are performed in a manner similar to that described above, except that a correlator 1250 has a first wavelength $\lambda_2$ discriminator 1255 to detect the start time of emitted pulses and a second wavelength $\lambda_2$ discriminator 1260 to detect the stop time of returned pulses. In this example the bipulse is thus signed by wavelength $\lambda_2$.

The emitted pulse discriminator can be a wavelength $\lambda_2$ discriminator 1255 as shown in FIG. 12B or can be substituted in a modified correlator 1275 with a pulse start-time discrimator 822 as shown in the example at 1270 of FIG. 12C.

FIG. 13A schematically illustrates at 1300 elements of a system such as the system of FIG. 7 for implementing signatures based on wavelength. In this example the laser subsystem 725 includes seed sources such as seed source 1305 and seed source 1310 responsive to a trigger signal 717 from pulse controller 715 for generating respective laser seeds such as Seed 1-Seed n. A multiplexer responsive to a signature signal 718 from pulse controller 715 multiplexes the laser seeds and supplies the result to a laser source such as an EDFA laser 1320. Laser 1320 amplifies a first pulse from a first seed source (e.g., 1305) and at least one pulse from a further seed source (e.g., 1310) to produce a pulse set having a first subpulse at a first wavelength and one or more subsequent subpulses at one or more other wavelengths. A splitter 1325 passes the first subpulse to a coupler 1330. A demultiplexer 1335 separates the subsequent pulse or pulses of the set into respective fibers by wavelength. A selectable combiner 1340 responsive to the signature signal 718 from pulse controller 715 selects a pulse of wavelength corresponding to the selected signature and passes it to coupler 1330. The output of coupler 1330 is a signed multipulse such as a bipulse 1345 having subpulses of different wavelengths, e.g., $\lambda_1$ and $\lambda_2$. The signature may also be defined by varying the interval between subpulses as in the examples above.

FIG. 13B schematically illustrates at 1302 elements of a system such as the system of FIG. 7 for implementing signatures based on wavelength. In this example the laser subsystem 725 includes a variable seed source 1308 (such as a Bragg grating) responsive to trigger signal 717 and signature signal 718 for supplying seed pulses at selected frequencies (e.g., $\lambda_1, \lambda_2, \ldots \lambda_m$) to a laser source 1320 such as an EDFA laser. Laser 1320 amplifies the seed pulses to produce a signed multipulse such as a bipulse 1345 having subpulses of different wavelengths, e.g., $\lambda_1$ and $\lambda_2$. The signature may also be defined by varying the interval between subpulses as in the examples above.

FIG. 14A shows at 1400 an example in which pulse sets have three subpulses per set. A system controller 1405 communicates with a sequencer 1410 which supplies sequence control signals to a pulse controller 1415. Pulse controller 1415 in turn supplies pulse control signals n, n+1, n+2 to respective seeds 1420, 1425, 1430 of a laser subsystem 1435, the seeds having respective wavelengths $\lambda_1, \lambda_2, \lambda_3$. A wavelength multiplexer 1440 combines the outputs of seeds 1420, 1425, 1430 to provide a combined result to laser (e.g., EDFA) 1445. The resulting signed pulse set includes pulses at delays n, n+1, n+2 having respective wavelengths $\lambda_1, \lambda_2, \lambda_3$. A splitter 1450 supplies emitted pulse references to a wavelength demultiplexer 1455. An optical subsystem 1452 (such as optical subsystem 845) delivers received pulses to wavelength demultiplexer 1455. Wavelength demultiplexer 1455 delivers pulses of wavelength $\lambda_1$ to a detector 1460 which provides a corresponding signal to time module 1465 to provide Tstart $\lambda_1$ and Tstop $\lambda_1$ signals to a time-of-flight computer 1490. Similarly, wavelength demultiplexer 1455 delivers pulses of wavelength $\lambda_2$ to a detector 1470 which provides a corresponding signal to time module 1475 to provide Tstart $\lambda_2$ and Tstop $\lambda_2$ signals to time-of-flight computer 1490, and wavelength demultiplexer 1455 delivers pulses of wavelength $\lambda_3$ to a detector 1480 which provides a corresponding signal to time module 1485 to provide Tstart $\lambda_3$ and Tstop $\lambda_3$ signals to time-of-flight computer 1490. Filters for the different wavelengths $\lambda_1, \lambda_2, \lambda_3$ could also be used instead of wavelength demux. The system can be integrated into a scanner apparatus having a scanner processor 1495 for managing the collection of measured target data.

FIG. 14B shows a variant of the example of FIG. 14A in which the individual time modules 1465, 1475, 1485 are replaced with a wavelength discriminator and multiplexer 1404 which includes a timing module 1406. An advantage of the example of FIG. 14A is that the detectors operate independently and are thus able to resolve overlapping return pulses, e.g., where return pulses are close in arrival time. A advantage of the example of FIG. 14B is lower cost as the cost of a single timing module is small relative to the cost of an added multiplexer.

FIG. 14C shows an example in which a pulse set having subpulses of differing frequencies is emitted and received. A subpulse E1 of wavelength $\lambda_1$ is emitted at a time t1, a subpulse E2 of wavelength $\lambda_2$ is emitted at time t2, a subpulse E3 of wavelength $\lambda_3$ is emitted at time t4, a subpulse E4 of wavelength $\lambda_1$ is emitted at time t6, etc. Subpulse E1 of wavelength $\lambda_1$ emitted at time t1 corresponds to a reflected pulse R2 received at time t4. Subpulse E2 of wavelength $\lambda_2$ emitted at time t2 corresponds to a reflected pulse R1 received at time t3. Subpulse E3 of wavelength $\lambda_3$ emitted at time t4 corresponds to a reflected pulse R3 received at time t7. Subpulse E4 of wavelength $\lambda_1$ is emitted at time t6. In this example, the reflected subpulses R1, R2, R3 are not received in the same order as their corresponding emitted subpulses E2, E1, E3. They are nonetheless correlated in the receiver electronics by their respective wavelengths to obtain correct distance measurements.

FIG. 15 is a flow diagram of a method 1500 in accordance with the invention. Laser pulse sets are emitted at 1505, each set having a signature. Returned laser pulse sets are detected at 1510. The signature of each detected laser pulse set is detected at 1515. A time of flight for each detected laser pulse set is determined at 1520.

Those of ordinary skill in the art will realize that the detailed description of embodiments of the present invention is illustrative only and is not intended to be in any way limiting. Other embodiments of the present invention will readily suggest themselves to such skilled persons having the benefit of this disclosure.

Reference is made in detail to implementations of the present invention as illustrated in the accompanying drawings. The same reference indicators are used throughout the drawings and the following detailed description to refer to the same or like parts.

In the interest of clarity, not all of the routine features of the implementations described herein are shown and described. It will be appreciated that in the development of any such actual implementation, numerous implementation-specific decisions must be made to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with embodiments of the present invention, the components, process steps and/or data structures may be implemented using various types of operating systems (OS), computer platforms, firmware, computer programs, computer languages and/or general-purpose machines. Portions of the methods can be run as a programmed process running on processing circuitry. The processing circuitry can take the form of numerous combinations of processors and operating systems, or a stand-alone device. The processes can be implemented as instructions executed by such hardware, by hardware alone, or by any combination thereof. The software may be stored on a program storage device readable by a machine. Computational elements, such as filters and banks of filters, can be readily implemented using an object-oriented programming language such that each required filter is instantiated as needed.

Those of skill in the art will recognize that devices of a less general-purpose nature, such as hardwired devices, field programmable logic devices (FPLDs), including field programmable gate arrays (FPGAs) and complex programmable logic devices (CPLDs), application specific integrated circuits (ASICs), or the like, may also be used without departing from the scope and spirit of the inventive concepts disclosed herein.

In accordance with an embodiment of the present invention, the methods may be implemented on a data processing computer such as a personal computer, workstation computer, mainframe computer, or high-performance server running an OS such as Microsoft® Windows® XP and Windows® 2000, available from Microsoft Corporation of Redmond, Wash., or various versions of the Unix operating system such as Linux available from a number of vendors. The methods may also be implemented on a multiple-processor system, or in a computing environment including various peripherals such as input devices, output devices, displays, pointing devices, memories, storage devices, media interfaces for transferring data to and from the processor(s), and the like. Such a computer system or computing environment may be networked locally, or over the Internet.

Any of the above-described methods and their embodiments may be implemented in part by means of a computer program. The computer program may be loaded on an apparatus as described above. Therefore, the invention also relates to a computer program, which, when carried out on an apparatus performs portions of any one of the above above-described methods and their embodiments.

The invention also relates to a computer-readable medium or a computer-program product including the above-mentioned computer program. The computer-readable medium or computer-program product may for instance be a magnetic tape, an optical memory disk, a magnetic disk, a magneto-optical disk, a CD ROM, a DVD, a CD, a flash memory unit or the like, wherein the computer program is permanently or temporarily stored. The invention also relates to a computer-readable medium (or to a computer-program product) having computer-executable instructions for carrying out any one of the methods of the invention.

The invention also relates to a firmware update adapted to be installed on apparatus already in the field, i.e. a computer program which is delivered to the field as a computer program product. This applies to each of the above-described methods and apparatuses.

Although the present invention has been described on the basis of detailed examples, the detailed examples only serve to provide the skilled person with a better understanding, and are not intended to limit the scope of the invention. The scope of the invention is much rather defined by the appended claims.

Following is a summary of some of the inventive concepts described herein

METHODS

[Signature Discrimination]
[Signature]
1. A method of measuring distance comprising:
   a. emitting a series of laser pulse sets, each laser pulse set comprising at least one pulse and having a signature selected from a set of possible signatures,
   b. detecting the laser pulse sets as reflected from at least one surface,
   c. recognizing the signature of each detected laser pulse set, and
   d. determining a time of flight for each of the detected laser pulse sets.

[Signature Types]
2. The method of 1, wherein the signature is determined by spacing in time between pulses of a pulse set.
3. The method of 1, wherein the signature of a pulse set is defined by wavelength of the at least one pulse of the pulse set.
4. The method of one of 1-3, wherein the signature is determined by spacing in time between a first subset of a pulse set and a second subset of a pulse set.
5. The method of one of 1-4, wherein each spacing defines a unique signature.
6. The method of one of 1-5, wherein the signature is determined by difference of wavelength between pulses of a pulse set.
7. The method of one of 1-6, wherein the signature is determined by difference of wavelength between a first subset of a pulse set and a second subset of a pulse set.
8. The method of one of 1-7, wherein a unique signature is defined by one of: a wavelength of a pulse set, and a wavelength difference between a first subset of a pulse set and a second subset of a pulse set.

[Amplitude Differences]
9. The method of one of 1-8, wherein each laser pulse set emitted has multiple groups of pulses and the pulses within a group have different amplitudes.
10. The method of 9, wherein within a group a first pulse has a first amplitude and at least one subsequent pulse has an amplitude higher than the first amplitude.

[Averaging]
11. The method of one of 1-10, wherein emitting a laser pulse set comprises emitting multiple pulses of substantially the same amplitude and wherein detecting a laser pulse set comprises averaging the measured detection times of multiple pulses of the laser pulse set.
12. The method of one of 1-11, wherein emitting a laser pulse set comprises emitting multiple groups of pulses having different pulse amplitudes within each group, and wherein detecting a laser pulse set comprises averaging the measured detected times of multiple groups of pulses of the laser pulse set.

[Signature Recognition—Pulse Spacing]

13. The method of one of 1-12, wherein recognizing the signature of each detected laser pulse set comprises
   determining respective detection times of pulses of the laser pulse set,
   determining a time difference between the detection times, and
   correlating the time difference with a signature of an emitted pulse set

[Signature Recognition—Wavelength]

14. The method of one of 1-13, wherein recognizing the signature of each detected laser pulse set comprises
   determining respective wavelengths of pulses of the laser pulse set, and
   correlating the determined wavelengths with a signature of an emitted pulse set.

[Time Correlation]

15. The method of one of 1-14, wherein:
   emitting a series of laser pulse sets comprises, for each emitted pulse set, determining a start time and associating the start time with the selected signature of the emitted pulse set;
   recognizing the signature comprises, for each detected pulse set, determining a signature of the detected pulse set; and
   determining a time of flight comprises, for each detected laser pulse set, determining a stop time for the detected pulse set, and associating the stop time with a start time which is associated with a signature corresponding to the signature of the detected pulse set.

16. The method of 15, wherein for each detected laser pulse set, the stop time and the associated start time comprise a couple from for use in determining a time of flight.

[Multi-Pulse-in-Air]

17. The method of one of 1-16, wherein multiple laser pulse sets are emitted prior to detecting a laser pulse set, and wherein each detected laser pulse set is uniquely identified by signature with an emitted laser pulse set.

[FIFO Correlator]

18. The method of one of 1-16, further comprising for each signature:
   storing in association with the signature a start time of each emitted laser pulse set having the signature,
   correlating a stop time of each detected laser pulse set recognized as having the signature with a start time stored in association with the signature,
   storing the stop time in association with the correlated start time to form a start-stop couple for the signature, and
   retrieving the stored start-stop couple in the order in which it was stored.

19. The method of one of 1-16, further comprising for each signature:
   storing in association with the signature a start time of each emitted laser pulse set having the signature,
   correlating one or more stop time of each detected laser pulse set recognized as having the signature with a start time stored in association with the signature,
   storing the different stop times in association with the correlated start time to form several start-stop couples for the signature, and
   retrieving the several stored start-stop couples in the order in which they were stored.

20. The method of one of 18 or 19, further comprising, for each signature, voiding the stop time or the stop times stored in association with the signature after retrieving the stored start-stop couple or couples when having to store a subsequent start time of an emitted laser pulse set having the signature.

APPARATUS

[Signature]

21. Apparatus for measuring distance comprising:
   a. a laser source adapted to emit a series of laser pulse sets, each laser pulse set comprising at least one pulse and having a signature selected from a set of possible signatures,
   b. a detector adapted to detect the laser pulse sets as reflected from at least one surface,
   c. a discriminator to recognize the signature of each detected laser pulse set, and
   d. a time-of-flight computer to determine a time of flight for each of the detected laser pulse sets.

[Signature Types]

22. The apparatus of 21, wherein the signature is determined by spacing in time between pulses of a pulse set.

23. The apparatus of 22, wherein the signature of a pulse set is defined by wavelength of the at least one pulse of the pulse set.

24. The apparatus of one of 21-23, wherein the signature is determined by spacing in time between a first subset of a pulse set and a second subset of a pulse set.

25. The apparatus of one of 21-24, wherein each spacing defines a unique signature.

26. The apparatus of one of 21-25, wherein the signature is determined by difference of wavelength between pulses of a pulse set.

27. The apparatus of one of 21-26, wherein the signature is determined by difference of wavelength between a first subset of a pulse set and a second subset of a pulse set.

28. The apparatus of one of 21-27, wherein a unique signature is defined by one of: a wavelength of a pulse set, and a wavelength difference between a first subset of a pulse set and a second subset of a pulse set.

[Amplitude Differences]

29. The apparatus of one of 21-28, wherein each laser pulse set emitted has multiple groups of pulses and the pulses within a group have different amplitudes.

30. The apparatus of 29, wherein within a group a first pulse has a first amplitude and at least one subsequent pulse has an amplitude higher than the first amplitude.

[Averaging]

31. The apparatus of one of 21-30, wherein the laser source is adapted to emit a laser pulse set having multiple pulses of substantially the same amplitude and wherein the detector is adapted to determine an average measured detected time over multiple pulses of each detected laser pulse set.

32. The apparatus of one of 21-31, wherein the laser source is adapted to emit a laser pulse set comprising multiple groups of pulses having different pulse amplitudes within each group, and wherein the detector is adapted to determine average measured detected times over multiple groups of pulses of the laser pulse set.

[Signature Recognition—Pulse Spacing]

33. The apparatus of one of 21-32, wherein the discriminator is adapted to recognize the signature of each detected laser pulse set by
   determining respective detection times of pulses of the laser pulse set, determining a time difference between the detection times, and correlating the time difference with a signature of an emitted pulse set.

[Signature Recognition—Wavelength]

34. The apparatus of one of 21-33, wherein the discriminator is adapted to recognize the signature of each detected laser pulse set by determining respective wavelengths of pulses of the laser pulse set, and correlating the determined wavelengths with a signature of an emitted pulse set.

[Time Correlation]

35. The apparatus of one of 21-34, further comprising a correlator adapted to:

determine, for each emitted pulse set, a start time and associating the start time with the selected signature of the emitted pulse set;

determine, for each detected laser pulse set, a stop time for the detected pulse set; and associate the stop time with a start time which is associated with a signature corresponding to the signature of the detected pulse set.

36. The apparatus of 35, wherein for each detected laser pulse set, the stop time or the stop times and the associated start time form a couple or several couples for use in determining a time of flight.

[Multi-Pulse-in-Air]

37. The apparatus of one of 21-36, wherein the laser source is adapted to emit multiple laser pulse sets prior to detection by the detector of a laser pulse set, and wherein a correlator is adapted to uniquely identify each detected laser pulse set by signature with an emitted laser pulse set.

[FIFO Correlator]

38. The apparatus of one of 21-37, further comprising a correlator adapted to, for each signature:

store in association with the signature a start time of each emitted laser pulse set having the signature, correlate one or several stop times of each detected laser pulse set recognized as having the signature with a start time stored in association with the signature, store the stop time or the several stop times in association with the correlated start time to form a start-stop couple or several start-stop couples for the signature, and retrieve the stored start-stop couple in the order in which it was stored.

39. The apparatus of 37, further adapted to, for each signature, void a stop time stored in association with the signature after retrieving the stored start-stop couple when having to store a subsequent start time of an emitted laser pulse set having the signature.

The invention claimed is:

1. A method of measuring distance comprising:
a. emitting a series of laser pulse sets, each emitted laser pulse set comprising at least two adjacent pulses and each emitted laser pulse set having a signature selected from a set of possible signatures, each of the possible signatures defined by one or more characteristics that enable discrimination between each emitted laser pulse set in the series of emitted laser pulse sets, wherein the signature is determined by at least one of (i) spacing in time between pulses of an emitted laser pulse set and (ii) a difference of amplitude between pulses of an emitted laser pulse set,
b. detecting laser pulse sets as reflected from at least one surface,
c. recognizing the signature of each detected laser pulse set by correlating the signature of each detected laser pulse set with the signature of one of the emitted laser pulse sets, and
d. determining a time of flight for each of the detected laser pulse sets by referencing to a respective emitted laser pulse set having a matching signature.

2. The method of claim 1, wherein the signature of a first emitted laser pulse set is determined by the spacing in time between a first subset of the first emitted laser pulse set and a second subset of the first emitted laser pulse set.

3. The method of claim 1, wherein the spacing in time between the pulses of each emitted laser pulse set defines a unique signature.

4. The method of claim 1, wherein each emitted laser pulse set has multiple groups of pulses, and the pulses within each group have different amplitudes.

5. The method of claim 4, wherein within a group, a first pulse has a first amplitude and at least one subsequent pulse has an amplitude higher than the first amplitude.

6. The method of claim 1, wherein emitting a laser pulse set comprises emitting multiple pulses of substantially the same amplitude, and wherein detecting a laser pulse set comprises averaging measured detection time of multiple pulses of the detected laser pulse set.

7. The method of claim 1, wherein emitting a laser pulse set comprises emitting multiple groups of pulses having different pulse amplitudes within each group, and wherein detecting a laser pulse set comprises averaging detected times of multiple groups of pulses of the detected laser pulse set.

8. The method of claim 1, wherein recognizing the signature of each detected laser pulse set comprises determining respective detection times of pulses of the detected laser pulse set, determining a time difference between the detection times, and correlating the time difference with the signature of an emitted laser pulse set.

9. The method of claim 1, wherein emitting a series of laser pulse sets comprises, for each emitted laser pulse set, determining a start time and associating the start time with the selected signature of the emitted laser pulse set; recognizing the signature comprises, for each detected laser pulse set, determining a signature of the detected laser pulse set; and determining a time of flight comprises, for each detected laser pulse set, determining a stop time for the detected laser pulse set, and associating the stop time with a start time which is associated with a signature corresponding to the signature of the detected laser pulse set.

10. The method of claim 9, wherein for each detected laser pulse set, the stop time and the associated start time comprise a couple for use in determining a time of flight.

11. The method of claim 1, wherein multiple laser pulse sets are emitted prior to detecting a laser pulse set, and wherein each detected laser pulse set is uniquely identified by the signature associated with the emitted laser pulse set.

12. The method of claim 1, further comprising: storing a start time of each emitted laser pulse set and an associated signature, and correlating a stop time of each detected laser pulse set with a respective start time based on the signature to form a start-stop couple for use in determining a time of flight.

13. The method of claim 1, wherein a single time of flight is determined for each detected laser pulse set.

14. The method of claim 1, wherein the signature of a first emitted laser pulse set is different from the signature of a second emitted laser pulse set that is adjacent to the first emitted laser pulse set in the series of laser pulse sets.

15. The method of claim 1, wherein the signature of a first emitted laser pulse set is different from the signature of a second emitted laser pulse set that is adjacent to the first emitted laser pulse set in the series of laser pulse sets, and the signature of the first emitted laser pulse set is the same as the signature of another emitted laser pulse set that is not adjacent to the first emitted laser pulse set in the series of laser pulse sets.

16. Apparatus for measuring distance comprising:
   a. a laser source operative to emit a series of laser pulse sets, each emitted laser pulse set comprising at least two adjacent pulses and each emitted laser pulse set having a signature selected from a set of possible signatures, each of the possible signatures defined by one or more characteristics that enable discrimination between each emitted laser pulse set in the series of laser pulse sets, wherein the signature is determined by at least one of (i) spacing in time between pulses of an emitted laser pulse set and (ii) a difference of amplitude between pulses of an emitted laser pulse set,
   b. a detector operative to detect laser pulse sets as reflected from at least one surface,
   c. a discriminator to recognize the signature of each detected laser pulse set by correlating the signature of each detected laser pulse set with the signature of one of the emitted laser pulse sets, and
   d. a time-of-flight computer to determine a time of flight for each of the detected laser pulse sets by referencing to the respective emitted laser pulse set having a matching signature.

17. The apparatus of claim 16, wherein the discriminator is operative to determine the signature of each detected laser pulse set by the spacing in time between a first subset of a laser pulse set and a second subset of the laser pulse set.

18. The apparatus of claim 16, wherein the laser source is operative to emit multiple groups of pulses, and the pulses within each group have different amplitudes.

19. The apparatus of claim 18, wherein within a group, a first emitted pulse has a first amplitude and at least one subsequent emitted pulse has an amplitude higher than the first amplitude.

20. The apparatus of claim 16, wherein the laser source is operative to emit a laser pulse set having multiple pulses of substantially the same amplitude, and wherein the detector is operative to determine an average measured detected time over multiple pulses of each detected laser pulse set.

21. The apparatus of claim 16, wherein the laser source is operative to emit a laser pulse set comprising multiple groups of pulses having different pulse amplitudes within each group, and wherein the detector is operative to determine average measured detected times over multiple groups of pulses of the detected laser pulse set.

22. The apparatus of claim 16, wherein the discriminator is operative to recognize the signature of each detected laser pulse set by determining respective detection times of pulses of the detected laser pulse set, determine a time difference between the detection times, and correlate the time difference with a signature of an emitted laser pulse set.

23. The apparatus of claim 16, further comprising a correlator operative to: determine, for each emitted laser pulse set, a start time and associating the start time with the selected signature of the emitted laser pulse set; determine, for each detected laser pulse set, a stop time for the detected laser pulse set; and associate the stop time with a start time which is associated with a signature corresponding to the signature of the detected laser pulse set.

24. The apparatus of claim 23, wherein for each detected laser pulse set, the stop time and the associated start time comprise a couple for use in determining a time of flight.

25. The apparatus of claim 16, wherein the laser source is operative to emit multiple laser pulse sets prior to detection by the detector of a laser pulse set, and wherein a correlator is operative to uniquely identify each detected laser pulse set by the signature associated with an emitted laser pulse set.

26. The apparatus of claim 16, further comprising a correlator operative to: store a start time of each emitted laser pulse set and an associated signature, and correlate a stop time of each detected laser pulse set with a respective start time based on the signature to form a start-stop couple for use in determining a time of flight.

27. The apparatus of claim 16, wherein the laser source is operative to emit a first emitted laser pulse set having a signature that is different from a signature of a second emitted laser pulse set that is adjacent to the first laser pulse set in the series of laser pulse sets.

28. The apparatus of claim 16, wherein the laser source is operative to emit a first emitted laser pulse set having a signature that is different from a signature of a second emitted laser pulse set that is adjacent to the first emitted laser pulse set in the series of laser pulse sets, and the laser source is operative to emit another emitted laser pulse set that is not adjacent to the first emitted laser pulse set in the series of laser pulse sets that has a signature that is the same as the signature of the first emitted laser pulse set.

* * * * *